United States Patent [19]

Neufeld

[11] Patent Number: 5,668,971
[45] Date of Patent: Sep. 16, 1997

[54] POSTED DISK READ OPERATIONS PERFORMED BY SIGNALLING A DISK READ COMPLETE TO THE SYSTEM PRIOR TO COMPLETION OF DATA TRANSFER

[75] Inventor: E. David Neufeld, Tomball, Tex.

[73] Assignee: Compaq Computer Corporation, Houston, Tex.

[21] Appl. No.: 607,598

[22] Filed: Feb. 27, 1996

Related U.S. Application Data

[63] Continuation of Ser. No. 983,815, Dec. 1, 1992, abandoned.

[51] Int. Cl.[6] .................................................. G06F 13/20
[52] U.S. Cl. .......................... 711/111; 395/285; 711/154; 711/167
[58] Field of Search ................................ 395/285, 481, 395/494, 438

[56] References Cited

U.S. PATENT DOCUMENTS

| | | | |
|---|---|---|---|
| 4,280,176 | 7/1981 | Tan | 395/425 |
| 4,851,988 | 7/1989 | Trottier et al. | 364/200 |
| 4,926,322 | 5/1990 | Stimac et al. | 364/200 |
| 4,947,366 | 8/1990 | Johnson | 395/416 |
| 5,045,998 | 9/1991 | Begun et al. | 395/325 |
| 5,075,846 | 12/1991 | Reininger et al. | 395/425 |
| 5,148,432 | 9/1992 | Gordon et al. | 364/200 |
| 5,287,462 | 2/1994 | Jibbe et al. | 395/275 |
| 5,293,603 | 3/1994 | MacWilliams et al. | 395/425 |
| 5,313,626 | 5/1994 | Jones et al. | 395/575 |
| 5,325,499 | 6/1994 | Kummer et al. | 395/425 |
| 5,353,415 | 10/1994 | Wolford et al. | 395/442 |
| 5,353,416 | 10/1994 | Olson | 395/325 |
| 5,434,976 | 7/1995 | Tan et al. | 395/200 |
| 5,461,718 | 10/1995 | Tatosian et al. | 395/416 |
| 5,463,753 | 10/1995 | Fry et al. | 395/473 |
| 5,463,755 | 10/1995 | Dumarot et al. | 395/475 |

OTHER PUBLICATIONS

Spencer Ng, "Some Design Issues of Disk Arrays", IEEE Apr. 1989, pp. 137–142.
Wes E. Meador, "Disk Array Systems", IEEE, Apr. 1989, pp. 143–146.
David A. Patterson, Garth Gibson, and Randy H. Katz, "A Case for Redundant Arrays of Inexpensive Disks" (Raid, Report No. UCB/CSD 87/931, Dec. 1987, Computer Science Division, University of California, Berkeley, California, pp. 109–116.

Primary Examiner—Reba I. Elmore
Attorney, Agent, or Firm—Pravel, Hewitt, Kimball & Krieger

[57] ABSTRACT

An apparatus and method for performing queued or posted disk read operations. The present invention determines the range of memory addresses to which data is to be transferred from a disk to memory and sets protection for this range of addresses. The present invention will issue a read complete signal upon issuing the read command and will prevent access to the range of memory addresses until the transfer of information from disk to memory is actually complete. Upon actual completion of the data transfer, the present invention will issue a read complete confirmation which will clear address range protection. The present invention may be implemented using special circuitry and a modified device drive to store the range protection addresses. Alternately, the method of the present invention may utilize paged memory techniques present within the microprocessor.

18 Claims, 12 Drawing Sheets

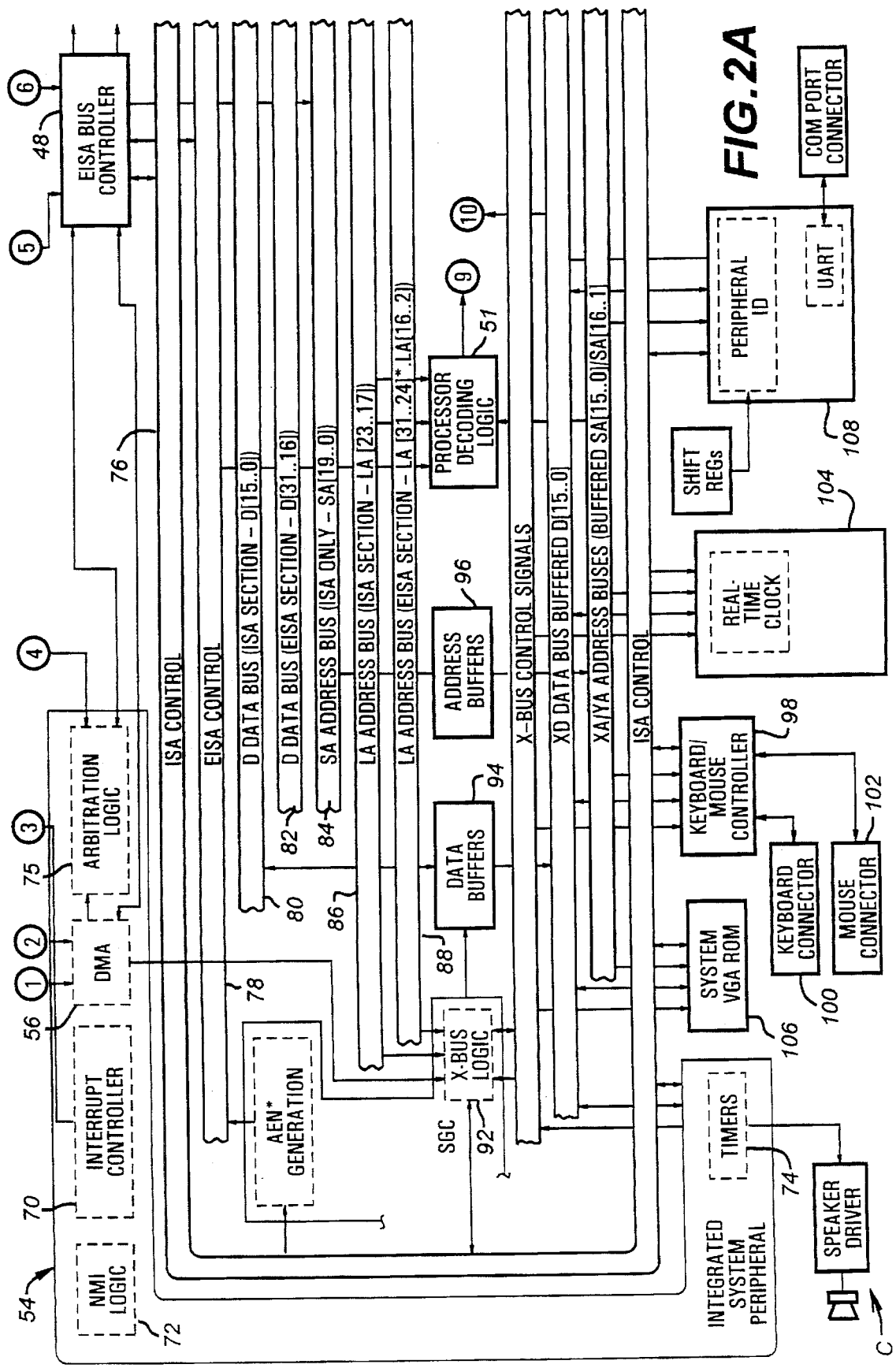

| PORT NAME | P1 | P2 | ADDRESS | PRS<3..0> |
|---|---|---|---|---|
| P1 CACHE CONTROL (I/O) | R/W | | XXXX0C67 | 0 0 0 0 |
| P2 CACHE CONTROL (I/O) | | R/W | XXXXFC67 | 0 0 0 1 |
| P1 NCP INT CLEAR (I/O) | Wp | | XXXX00F0 | 0 0 1 0 |
| P2 NCP INT CLEAR (I/O) | | Wp | XXXX00F0 | 0 0 1 1 |
| P1 CONTROL PORT (I/O) | R/W | | XXXX0C6A | 0 1 0 0 |
| P2 CONTROL PORT (I/O) | Wb3 | R/W | XXXXFC6A | 0 1 0 1 |
| EAI REGISTER (I/O) | R/W | | XXXX0C6B | 0 1 1 0 |
| RAM RELOCATION (MEMORY) | Wp | Wp | 80C00000 | 0 1 1 1 |
| P1 FLUSH CONTROL (MEMORY) | R/W | | 80C00002 | 1 0 0 0 |
| LORANGE <15:8> REGISTER (MEMORY) | R/W | | 80C00004 | 1 0 0 1 |
| LORANGE <23:16> REGISTER (MEMORY) | R/W | | 80C00006 | 1 0 1 0 |
| HIRANGE <15:8> REGISTER (MEMORY) | R/W | | 80C00008 | 1 0 1 1 |
| HIRANGE <23:16> REGISTER (MEMORY) | R/W | | 80C0000A | 1 1 0 0 |
| NO PORT SELECTED | — | — | — | 1 1 1 1 |

*FIG. 4*

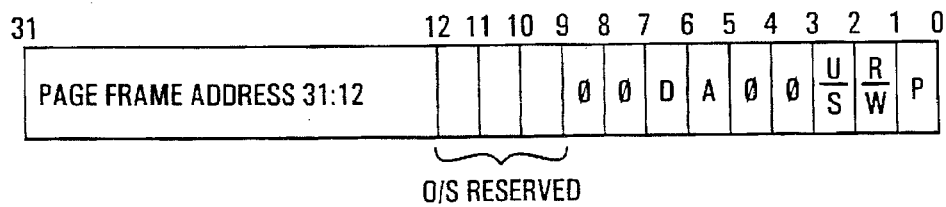

*FIG. 13*

POSTED DISK READ OPERATIONS PERFORMED BY SIGNALLING A DISK READ COMPLETE TO THE SYSTEM PRIOR TO COMPLETION OF DATA TRANSFER

This is a continuation of application Ser. No. 07/983,815 filed on Dec. 1, 1992, abandoned.

BACKGROUND OF THE INVENTION

1. Field of the Invention

The present invention is directed toward a method for improving disk input/output operations within computer systems, and more particularly, to a method for performing disk operations utilizing a posted read technique and address range protection.

2. Description of the Related Art

Personal computer systems have developed over the years and new uses for them are being discovered daily. The uses are varied and, as a result, have different requirements for various subsystems forming a complete computer system. With the increased performance of computer systems, it became apparent that mass storage subsystems, such as fixed disk drives, played an increasingly important role in the transfer of data to and from the computer system.

In the past few years, a new trend in storage subsystems has emerged for improving data transfer performance, capacity and reliability. This is generally known as a disk array subsystem. One reason for building a disk array subsystem is to create a logical device that has a very high data transfer rate. This may be accomplished by "ganging" multiple standard disk drives together and transferring data to or from these drives to the system memory. If n drives are ganged together, then the effective data transfer rate is increased up to n times. This technique, known as striping, originated in the supercomputing environment where the transfer of large amounts of data to and from secondary storage is a frequent requirement. With this approach, the n physical drives become a single logical device and may be implemented either through software or hardware.

A number of reference articles on the design of disk arrays have been published in recent years. These include "Some Design Issues of Disk Arrays" by Spencer Ng, April, 1989 IEEE; "Disk Array Subsystems" by Was E. Meador, April, 1989 IEEE; and "A Case for Redundant Arrays of Inexpensive Disks (RAID)" by D. Patterson, G. Gibson and R. Catts, Report No. UCB/CSD 87/931, December 1987, Computer Science Division, University of California, Berkeley, Calif.

In general, these previous techniques have used several controller boards which could access multiple drives over a small computer system interface (SCSI). Multiple SCSI controller boards were used with multiple drives connected to each controller board. Software resident in the host computer itself performed the operation of the data distribution and control of the various controller boards and of the specific drives on a given controller board. While high disk transfer rates could be developed, the host computer was still tied up performing various control functions.

Recent personal computers have developed bus architectures which are capable of sustaining devices which are called bus masters. A bus master may take control of the computer system at certain times and transfer data between the bus master and the system memory without requiring the service of the main or host processor. The bus master can then release the bus back to the host processor when the transfers are not necessary. In this manner, coprocessing tasks can be developed. Especially suitable for such coprocessing tasks are graphical displays, network interfacing and hard disk control subsystems. The various buses or architectures capable of supporting bus masters are exemplified by the Micro Channel Architecture (MCA) developed by International Business Machines Corporation (IBM) and the Extended Industry Standard Architecture (EISA). Thus, it became obvious to place a local processor on a separate board which could be inserted into these types of architecture for disk control functions. Intelligent disk array subsystems of this type are exemplified by the disk array controller disclosed in U.S. Pat. No. 5,206,943 for "Disk Array Controller with Parity Capabilities" assigned to Compaq Computer Corporation, assignee of the present invention, and in European Patent Office Publication No. 0427119, published Apr. 4, 1991, the counterpart to the U.S. application. The apparatus described therein utilized a disk array DMA channel composed of four individual subchannels. A dedicated XOR engine utilized one of the four subchannels, generating parity data on a word for word basis from up to four different transfer blocks. The XOR engine was also capable of writing the result to a specified drive or to a transfer buffer through the subchannel.

The use of a bus master to control disk transfer operations decreased the load on the host computer. However, the transfer of data to or from memory to the disk or disk array, or vice versa, still required time to request and complete the transfer of data. This often resulted in the host computer waiting until the disk transfer completed prior to resuming processing of the application task which requested the disk transfer. This is particularly true in the instance where the application program required information be READ from a disk to memory prior to the processor continuing execution the applications program. The reason for this idle period is apparent. If the computer attempted to READ data from memory address space to which the disk information was being transferred, prior to the completion of the transfer, the computer would READ bad or inaccurate data. Thus, computers generally waited until the transfer of data from disk to memory was complete prior to resuming execution of the applications program.

One technique long used to reduce host processor waiting times during disk transfer operations was the queued or posted WRITE technique. In WRITE operations, an active task generated a WRITE request, which was passed on to a disk device driver. The disk driver, which was special software resident on the host computer, assumed control of the system processor and generated the necessary commands to carry out WRITE operations to the disk drive or drives. During the period that the write to disk was taking place, the active process or task was in a WAIT state until the device driver received a signal from the disk controller which indicated that the WRITE operation was completed. Upon receiving the WRITE complete signal, the disk device driver software released control of the system processor and the processor resumed processing the active task.

In the posted or queued WRITE technique, the device driver directed the disk commands to a temporary queue in main memory instead of the disk controllers. A WRITE completion signal was sent by the disk driver to the processor and the disk device driver released control of the system processor to continue execution of the current task. The disk commands were then executed by the disk device driver at a later time during which a task was not active. This permitted the computer system to reduce the delay in returning to the active task.

The posted WRITE technique was also used on an intelligent disk array controller of the type exemplified in U.S.

patent application Ser. No. 431,735. An active task generating a WRITE command would cause the disk device driver to assume control of the system processor. The device driver caused the system processor to generate a WRITE command list similar to that described in U.S. Pat. No. 5,249,279 assigned to Compaq computer corporation, assignee of the present invention. The WRITE command list is also described in European Patent Office Publication No. 0426184, published Mar. 27, 1991, which corresponds to U.S. Pat. No. 5,249,279. The WRITE command list may include multiple commands, including diagnostic commands, disk addresses for data to be transferred to and the number of bytes to be transferred. The WRITE command list was sent to the disk array controller and the disk device driver waited until it received a WRITE complete signal. Upon receipt of the command list, the disk array controller signaled a WRITE complete to the disk device driver, which released the system processor to resume execution of the current task. The disk array controller, including a bus master and local processor, independently carried out the WRITE commands without intervention by the system processor. Upon actual completion of the WRITE operations, the disk array controller would issue a WRITE complete confirmation signal, indicating actual completion of WRITE operations.

Therefore, WRITE operations were improved by using posted WRITE procedures. However, similar improvements have not been available for READ operations. During READ operations, the active task is conventionally waiting for the data to be returned before it can continue processing. Thus, it conventionally must wait for the full READ operation to complete before proceeding. In multitasking systems, the READ request may be a basis for a task switch, such that a different task becomes active and the requesting task is paused. While this may improve overall performance, the performance of the particular task is still reduced and may even be further reduced as a result of the task switch.

SUMMARY OF THE INVENTION

The present invention is directed toward a method and apparatus for performing disk operations, and more specifically the use of posted READ operations in a computer system utilizing memory address range protection.

In the apparatus of the preferred embodiment, a modified disk device driver and additional circuitry are used to perform posted READ operations. The host processor issues a READ request in response to a data request by the active applications task. The READ request is passed on to the disk device driver, which exists as specialized software for the management of disk I/O operations.

The device driver instructs the system processor to write the memory address to which the disk data is being transferred to special registers within the computer system. The device driver will write the beginning, or low address, to a first register and an ending, or high address, to a second register. The device driver calculates the high address by adding a data offset, which represents the amount of data being transferred, to the low address. The device driver then instructs the system processor to assert the address of the requested data, the data offset, the memory address to which the data is to be transferred and various control signals required for the READ operation. The device driver will also instruct the processor to issue a signal which will flush the computer system cache memory controller to prevent any attempt to fill the READ request from cache memory.

The disk controller, upon receipt of the READ command, issues a READ complete signal to the device driver, which releases control of the system processor back to the applications program. It should be noted that the disk controller signals complete prior to the data transfer completing. The range protection special circuitry also includes a dedicated line to the disk or disk array controller. When the actual transfer is complete, the disk controller will signal across the dedicated line to the special circuitry, which clears the range protection.

The preferred embodiment of the apparatus prohibits access to the protected memory address range to which the data is being transferred until the disk READ operation is actually complete. In response to a memory READ operation, the system processor will assert the desired memory address, along with the necessary control signals to complete the memory READ. The memory address and the various control signals are routed to the special circuitry which delays assertion of the address cycle definition and control signals on the computer bus and is capable of withdrawing the processor from arbitration for the host bus. The special circuity compares the desired memory address with the low and high memory range protection addresses stored in the special registers and determines if the memory READ request address is within the range of protected addresses. If the requested memory address is within the protected range, the special circuitry will delay the requested address and necessary control signals until the disk transfer is actually complete. Further, the special circuitry will permit the processor to participate in bus arbitration and will release control of the bus, if necessary, until such time as the data transfer completes. The disk controller will issue the confirmation signal upon completion of the disk to memory transfer operation. Upon receipt of the completion signal, the special circuitry will clear the range protection, permitting the assertion of the requested address and necessary control signals and completion of the memory READ operation when the processor has, or regains, control of the bus.

The method of the preferred embodiment contemplates utilizing a posted READ technique in a multi-tasking, task switching environment utilizing paging memory management. In the method of the preferred embodiment, the active applications task generates a disk READ request. The disk READ request invokes the disk device driver which assumes control of the system processor. As with the preferred apparatus, the device driver causes the system processor to issue the disk address, the memory addresses to which the data is to be transferred and the necessary control signals to accomplish the disk READ operation. The device driver will also instruct the processor to clear a protection bit in the page table entry(ies) for the memory address pages which correspond to the physical address to which the data is to be transferred.

The device driver may then release control of the processor as if the READ command was completed. Alternatively, the device driver may wait for the disk controller to issue an interrupt signal, if the disk controller is aware of the desired early release, indicating a false completion, causing the device driver to then release its control the system processor upon receipt of the interrupt. In either case, the disk controller will then transfer the data to the appropriate memory addresses. Upon completion of the data transfer, the disk controller may issue an interrupt signal to the device driver, which, in one case, will instruct the processor to set the protection bit for the page table entry(ies) to which the data has been transferred to permit access and, in an alternate embodiment, will set a Release flag and set the protection bit for the page table entry(ies).

As with the preferred apparatus of the present invention, the preferred method of the present invention will prevent access to the memory addresses to which the disk data is being transferred until the transfer is complete. An attempt to access protected memory to which data is being transferred generates a memory READ request, which includes the memory address and the necessary control signals for the memory READ operation. The information is received by the memory management unit (MMU), which automatically determines if the page table address entry(ies) for the desired memory addresses are protected by checking the protection bit in the page table entry(ies). If the page entry(ies) protection bits for the requested address(es) are cleared, the MMU will generate a page fault exception, which will interrupt access to the memory addresses in the protected page table entries. A page fault is a type of exception which is detected and acted upon by the processor prior to the attempted execution of the instruction. Thus, the processor first acts upon the page fault then executes the instruction.

The page fault, which is caused by the attempt to read an address within a protected page table entry, will cause the system processor to invoke an Interrupt Service Routine (ISR), which will determine if other tasks are running on the system processor in a multi-tasking mode. If other tasks are running on the system processor, the ISR will instruct the system processor to execute a task switch to another task. The operating system in use or the user may set the amount of processor time allotted to one or more other tasks. The operating system will return to the task which generated the page fault following execution of other running tasks.

The ISR will determine if the Release flag, which may be used by the device driver to indicate completion of the disk to memory transfer, is set. The device driver will determine if the active task has been interrupted, in which instance, it will set the Release flag and set the protection bit in the appropriate page table entries. If the Release flag has been set, the ISR will clear the Release flag and return control of the processor to the interrupted task, so that the memory access operation completes. If the Release flag is not set or is not utilized and the protected bit is still cleared, the ISR will again task switch. In a multi-tasking mode, the ISR will continue to instruct the processor to task switch until the Release flag is set or the protection bit is set, indicating completion of data transfer.

Where no other tasks are running on the system processor, the ISR will place the system processor in a WAIT state until such time as the Release flag is set, indicating that the page entry protection bit has been set. When the disk controller issues the READ confirmation signal, the device driver will set the protection bit or clear the Release flag and set the protection bit, as appropriate, which will be duly noted by the ISR, thereby permitting completion of the memory access.

Thus, the preferred method of the present invention provides for the use of posted READ operations in a multi-tasking environment. It is contemplated that the method of the present invention may be utilized for various computer operating systems including various single task or multi-tasking environments. Further, it is contemplated that the present invention may be used in a computer system utilizing multiple processor and conventional disk drives as well as intelligent disk arrays.

BRIEF DESCRIPTION OF THE DRAWINGS

A better understanding of the present invention can be had when the following detailed description of the preferred embodiment is considered in conjunction with the following drawings, in which:

FIGS. 1 and 2A–B are block diagrams of an illustrative computer system on which the method of the present invention may be practiced;

FIG. 4 is a table of the special register encoding scheme used within the preferred apparatus embodiment of the present invention;

FIG. 13 is a diagram of a page table entry used within the preferred method embodiment of the present invention;

DETAILED DESCRIPTION OF THE PREFERRED EMBODIMENT

Figure 1:
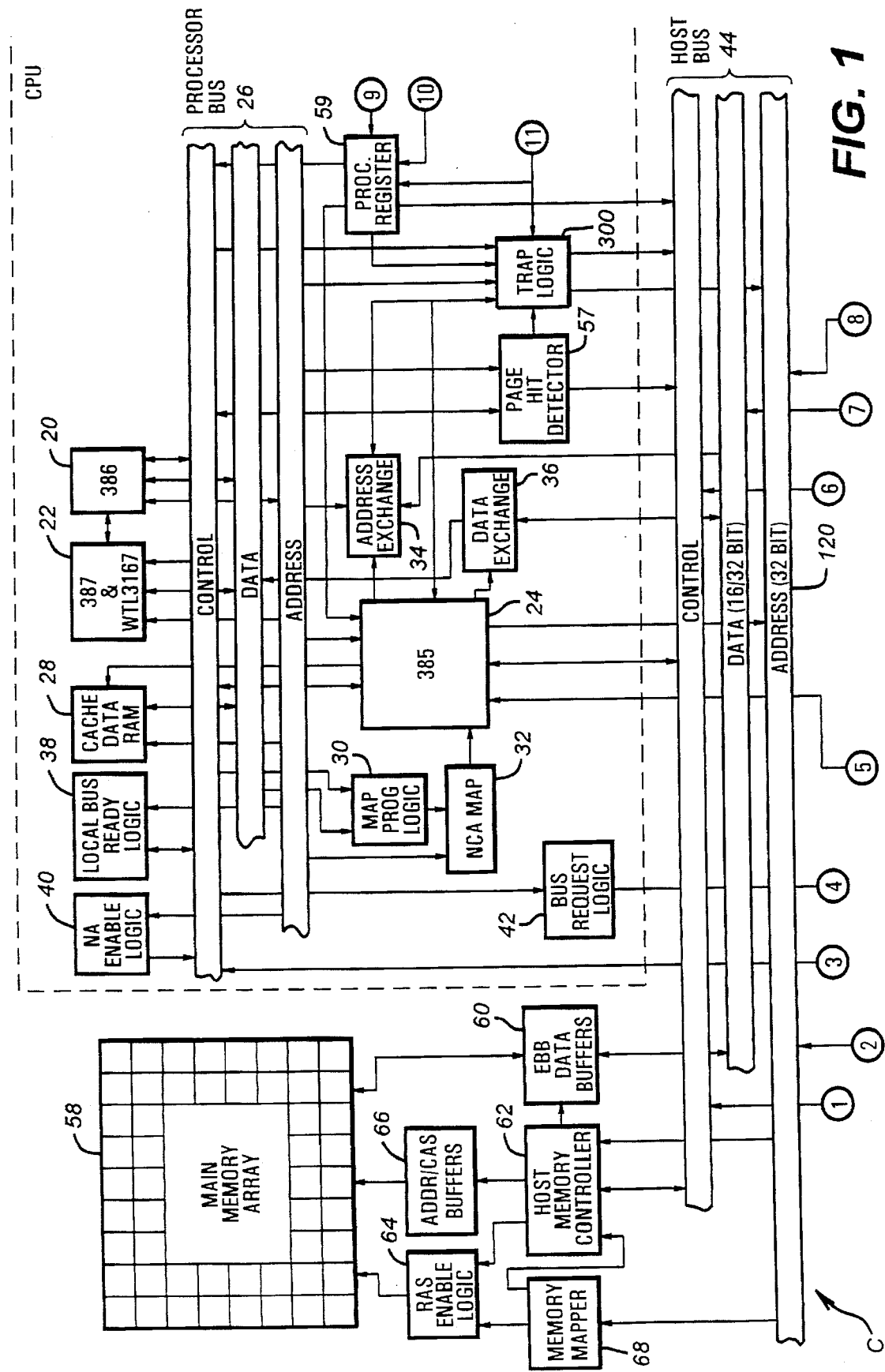
Figure 2B:
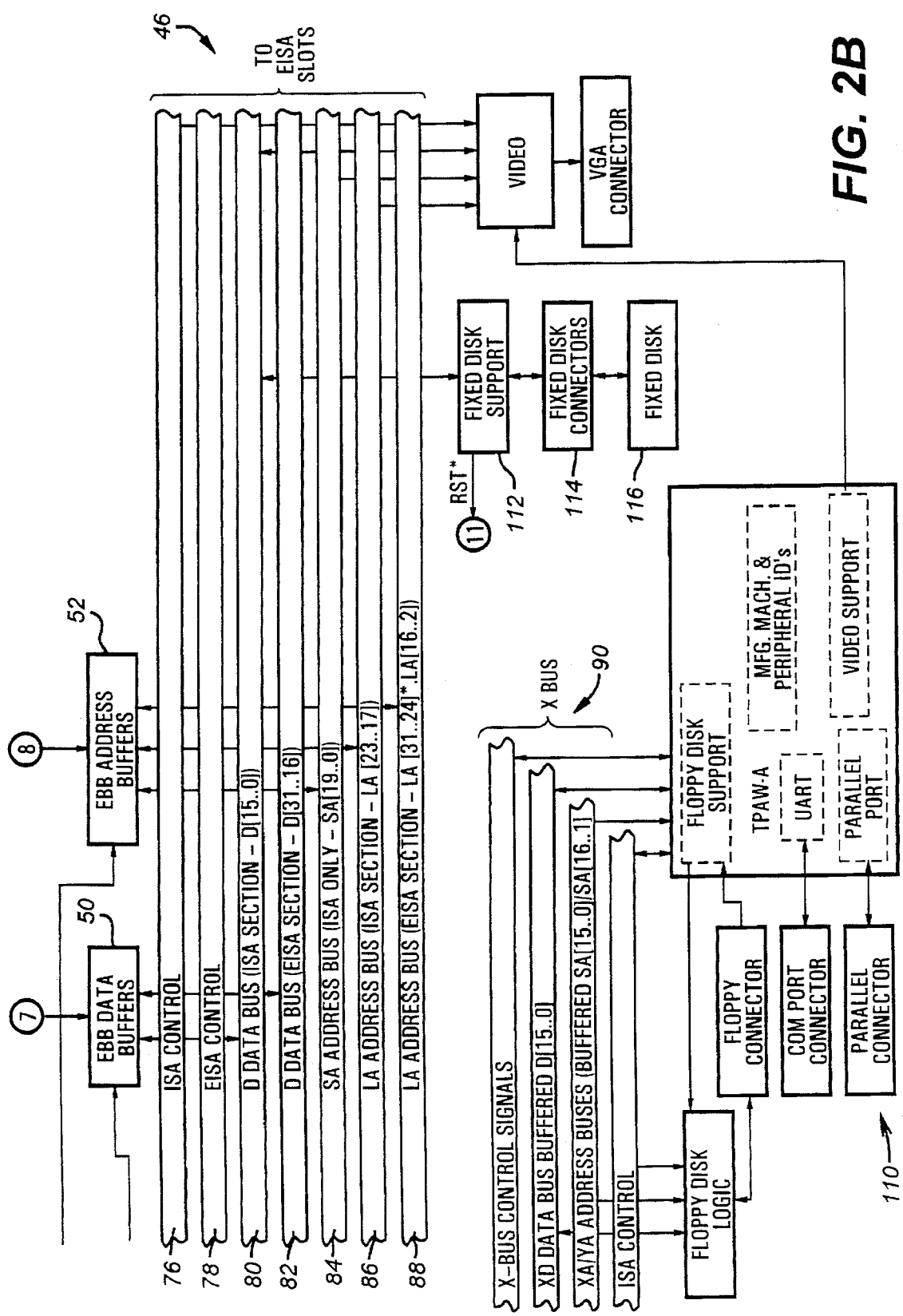

The computer system and disk array subsystem described in FIGS. 1 and 2A–B represent an illustrative embodiment of a computer system on which the present invention may be practiced and implemented. It is also contemplated that other computer systems, not having the capabilities of the system described below, may be used to practice the present invention.

Referring now to FIGS. 1 and 2A–B, the letter C generally designates a computer system on which the present invention may be practiced. For clarity, system C is shown in two portions with the interconnections between FIGS. 1 and 2A–B designated by reference to the circled numbers 1 to 11. System C is comprised of a number of block elements interconnected via 4 busses.

A central processing unit CPU comprises a system processor 20, a numerical co-processor 22, a cache memory controller 24, and associated logic circuits connected to a system processor bus 26. Associated with cache controller 24 is a high speed cache data random access memory (DRAM) 28, non-cacheable memory address map programming logic circuitry 30, non-cacheable address memory 32, address exchange latch circuitry 34 and data exchange transceiver 36. Associated with the CPU also are system processor ready logic circuit 38, next address enable logic circuit 40 and bus request logic circuit 42.

The system processor is preferably an Intel Corporation 80386 or 80486 microprocessor. The system processor 20 has its control, address and data lines interfaced to the system processor bus 26. The co-processor 22 is preferably an Intel 80387 and/or Weitek WTL3167 numerical processor interfacing with the local processor bus 26 and the system processor 20 in the conventional manner. The cache RAM 28 is preferably a suitable high-speed static random access memory which interfaces with the address and data elements of bus 26 under the control of the cache controller 24 to carry out required cache memory operations. The cache controller 24 is preferably an Intel 82385 cache controller configured to operate in two-way set associative master mode. In the preferred embodiment, the components are the 33 MHZ versions of the respective units. An Intel 80486 microprocessor and an external cache memory system may replace the 80386, numeric coprocessor, 82385 and cache system if desired. Address latch circuity 34 and data transceiver 36 interface the cache controller 24 with the processor 20 and provide a local bus interface between the processor bus 26 and a host bus 44. Circuit 38 is a logic circuit which provides a bus ready signal to control access to the bus 26 and indicate when the next cycle may begin. The enable circuit 40 is utilized to indicate that the next address of data or code to be utilized by subsystem elements in the pipelined address mode may be placed on the local processor bus 26.

Non-cacheable memory address map programmer 30 cooperates with the processor 20 and the non-cacheable address memory 32 to map non-cacheable memory locations. The non-cacheable address memory 32 is utilized to designate areas of the system memory that are non-cacheable to avoid many types of cache memory incoherency. The bus request logic circuit 42 is utilized by the processor 20 and associated elements to request access to the host bus 44 in situations such as when requested data is not located in cache memory 28 and access to system memory is required. Associated with the cache controller 24 is a page hit logic detector 57 for use with page mode memory devices. Page hit logic detector 57 is also in signal communications with trap logic 300. Interfaced to the control bus of the processor bus 26 is a set of special processor registers 59 and their associated processor register address decoding logic 51.

The specialized processor registers 59 are similar to the interprocessor registers described in U.S. patent application Ser. No. 431,659, assigned to Compaq Computer Corporation, assignee of the present invention. A patent application corresponding to U.S. application Ser. No. 431,659 was published by the European Patent Office on Mar. 27, 1991, publication No. 0426161, and is hereby incorporated by reference. The special processor registers 59 are connected to processor register address decoding logic 51 (FIG. 2) which includes translation logic that translates the respective register addresses into four register select lines which are used to access the registers which are utilized in communications and other specialized applications within the computer system. In application Ser. No. 431,659 these registers are also used to manage communication in a multi-processor computer system.

The register select lines are also used to address the special address registers used within the present invention to store memory range protection addresses. A memory range protection address is a boundary memory address to which information is being transferred from a disk to memory during a posted READ operation. As there exists a low address and a high address, the special processor registers 59 must be capable of storing both addresses. The processor register address decoding logic 51 associated with the special processor registers 59 decodes the four register select lines into signals which properly access the appropriate special processor register. The special processor registers 59 are also interfaced with the XD data bus in an X bus 90. The special processor registers 59 received the memory protection range addresses across the XD bus. Further, the special processor registers 59 are in signal communications with the disk array controller 112 (FIGS. 2A–B) through a dedicated line.

Trap logic 300 is in signal communications with the control and address lines of the processor bus 26, the host bus 44, address latch circuitry 34, the page hit detector 57 and the disk array controller 112 (FIGS. 2A–B). The trap logic 300 is utilized within the present invention to trap address and control signals issued by the processor 20 in a memory READ cycle. The trap logic 300 also compares the memory access addresses with range protection addresses stored in the special processor registers 59. The trap logic 300 permits the processor 20 to participate in arbitration for the host bus 44 during the memory access but will release control of the host bus 44, if necessary, where the disk to memory transfer has not completed. Further, the trap logic 300 is in communication with the address latch circuity 34 and will delay the control signals and addresses required to complete the memory READ operation until the disk transfer has completed. The operation of the trap logic 300 will be explained in greater detail with reference to FIG. 9.

In FIGS. 1 and 2A–B, system C is configured as having the processor bus 26, the host bus 44, an extended industry standard architecture (EISA) bus 46 (FIG. 2) and an X bus 90. The details of the portions of the system illustrated in FIGS. 2A–B and not discussed in detail below are not significant to the present invention other than to illustrate an example of a fully configured computer system. The portion of System C illustrated in FIG. 2 is essentially a configured EISA system which includes the necessary EISA bus 46, and EISA bus controller 48, data latches and transceivers 50 and address latches and buffers 52 to interface between the EISA bus 46 and the host bus 44. Also illustrated in FIG. 2 is an integrated system peripheral (ISP) 54, which incorporates a number of the elements used in an EISA-based computer system.

The integrated ISP 54 includes a direct memory access controller 56 for controlling access to main memory 58 (FIG. 1) or memory contained in an EISA slot and input/output (I/O) locations without the need for access to the processor 20. The main memory array 58 is considered to be system memory. It comprises a memory circuit array of a size suitable to accommodate the particular requirements of the system. The ISP 54 also includes interrupt controllers 70, non-maskable interrupt logic 72, and system timer 74 which allow control of interrupt signals and generate necessary timing signals and wait states in a manner according to the EISA specification and conventional practice. In the preferred embodiment, processor generated interrupt requests are controlled via dual interrupt controller circuits emulating and extending conventional Intel 8259 interrupt controllers. The ISP 54 also includes bus arbitration logic 75 which, in cooperation with the bus controller 48, controls and arbitrates among the various requests for EISA bus 46 by cacheable controller 24, the DMA controller 56, and bus master devices located on the EISA bus 46.

The main memory array 58 is preferably dynamic random access memory. Memory 58 interfaces with the host bus 44 via a data buffer circuit 60, a memory management unit 62, and a memory mapper 68. The buffer 60 performs data transceiving and parity generating and checking functions. The memory management unit 62 and memory mapper 68 interface with the memory 58 via address multiplexor and column address strobe buffers 66 and row address enable logic circuit 64.

The processor register address decoding logic 51 is preferably interfaced with EISA control, LA address bus (ISA section—LA (23:17)) and LA address bus (EISA, section LA (31:24) and LA (16:2)) on the EISA bus 46. The processor register address decoding logic 51 is also interfaced with the X bus 90 XA address bus.

The EISA bus 46 includes ISA and EISA control busses 76 and 78, ISA and EISA data busses 80 and 82, and are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus are various peripheral devices such as keyboard/mouse controller 98 which interfaces with the X bus 90 with a suitable keyboard and a mouse via connectors 100 and 102, respectively. Also attached to the X bus are read only memory (ROM) circuits 106 which contain basic operation software for the System C and for system video operations. A serial port communications port 108 is also connected to the System C via the X bus 90. Floppy and fixed disk support, a parallel port, a second serial port, and video support circuits are provided in block circuit 110.

A disk array controller 112 is connected to the EISA bus 46, preferably in a slot, to provide for the communication of data and address information through the EISA bus 46. Fixed disk connectors 114 are connected to the fixed disk controller 112 and are in turn connected to a fixed disk array 116. Further, the disk controller 112 has a dedicated RST* line which is in signal communications with trap logic 300 and special processor registers 59.

Figure 3:
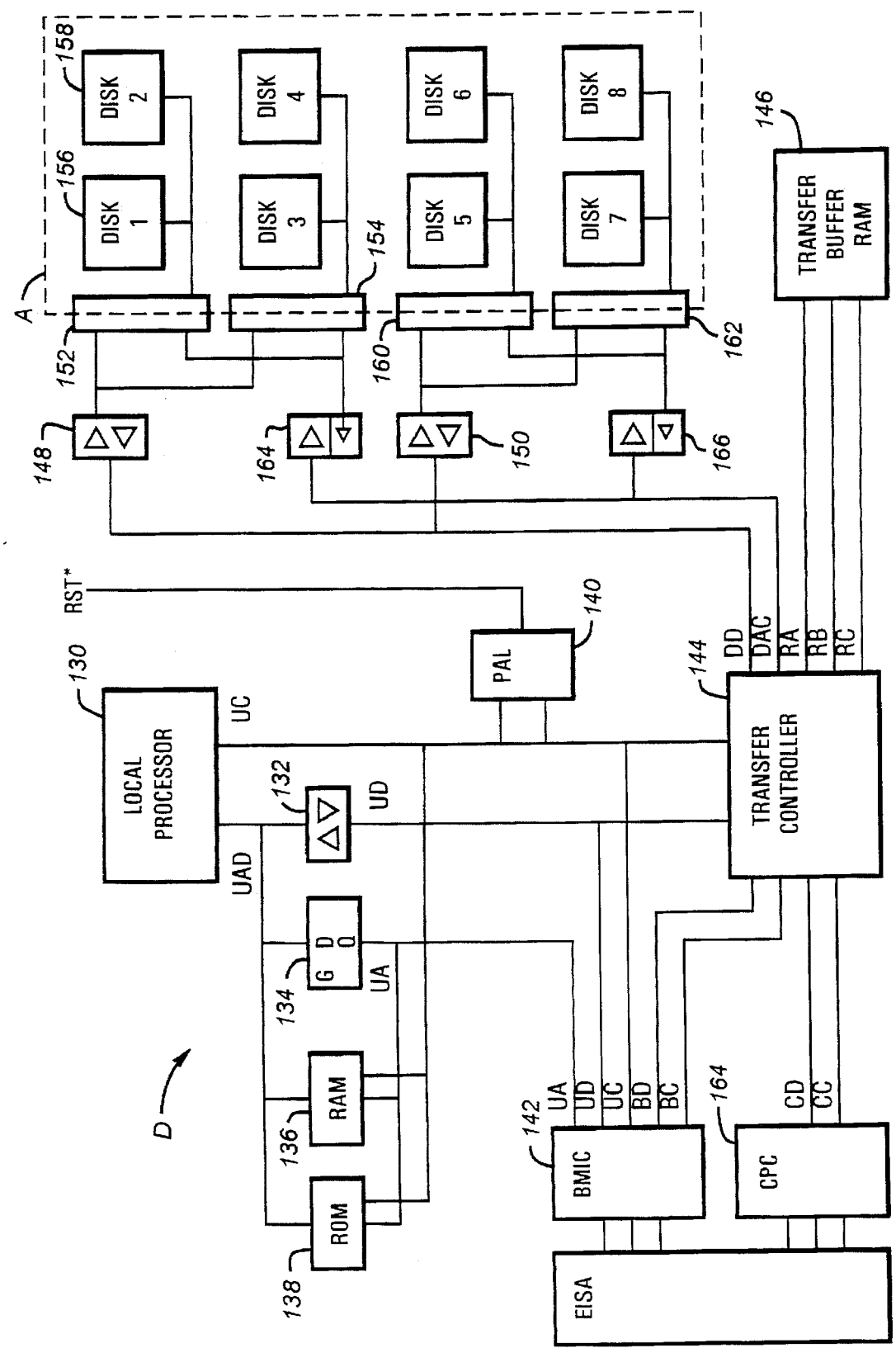
FIG. 3 is a schematic block diagram of a disk array controller on which the method of the present invention may be practiced.

Referring now to FIG. 3, the letter D generally refers to a disk array controller 112 used to illustrate the method and apparatus of the present invention. The disk array controller 112 has a local processor 130, preferably an Intel 80186. The local processor 130 has a multiplexed address/data bus UAD and control outputs UC. The multiplexed address data bus UAD is connected to a transceiver 132 whose output is the local processor data bus UD. The multiplexed address/data bus UAD is also connected to the D inputs of a latch 134 whose Q outputs form the local processor address bus UA. The local processor 130 has associated with it random access memory (RAM) 136 coupled via the multiplexed address/data bus UAD and the address data bus UA. The RAM 136 is connected to the processor control bus UC to develop proper timing signals. Similarly, read only memory (ROM) 138 is connected to the multiplexed address/data bus UAD, the processor address bus UA and the processor control bus UC. Thus, the local processor 130 has its own resident memory to control its operation and for its data storage. A programmable array logic (PAL) device 140 is connected to the local processor control bus UC to develop additional control signals utilized in the disk array controller 112. Further, PAL 140 is preferably utilized to generate a reset signal RST* which will be explained further below.

The local processor address bus UA, the local processor data bus, UD and the local processor control bus UC are also connected to a bus master interface controller (BMIC) 142. The BMIC 142 serves the function of interfacing the disk array controller 112 with a standard bus, such as the EISA or MCA bus and acts as a bus master. In the preferred embodiment, the BMIC 142 is interfaced with the EISA bus and is the Intel 82355. Thus, by this connection with the local processor busses UA, UD and UC, the BMIC 142 can interface with the local processor 130 to allow data and control information to be passed between the host system C and the local processor 130.

Additionally, the local processor data bus UD and local processor control bus UC are connected to a transfer controller 144 which is explained in greater detail in U.S. application Ser. No. 431,735, but is generally a specialized multi-channel direct memory access (DMA) controller used to transfer data between the transfer buffer RAM 146 and various other devices present in the disk array controller 112. For example, the transfer controller 144 is connected to the BMIC 142 by the BMIC data lines BD and the BMIC control lines BC. Thus, over this interface, the transfer controller 144 can transfer data from the transfer buffer RAM 146 through the transfer controller 144 to the BMIC 142 if a READ operation is requested. If a WRITE operation is requested, data can be transferred from the BMIC 142 through the transfer controller 144 to the transfer buffer RAM 146. The transfer controller 144 can then pass this information from the transfer buffer RAM 146 to disk array A.

The transfer controller 144 includes a disk data bus DD and a disk address and control bus DAC. The disk address and control DAC is connected to two buffers 165 and 166 which are used to send and receive control signals between the transfer controller 144 and the disk array A. The outputs of the transceiver 148 and the transfer buffer 146 are connected to two disk drive port connectors 152 and 154. These two hard disks 156 and 158 can be connected to each connector 152 or 154. In similar fashion, two connectors 160 and 162 are connected to the outputs of the transceiver 150 and the buffer 166. Thus, in the preferred embodiment, up to 8 disk drives can be connected and coupled to the transfer controller 144. In this way, the various data, address and control signals can pass between the transfer controller 144 and particularly disk drives 156 and 158, for example.

In the disk array controller system D, a compatibility port controller 164 (CPC) is also connected to the EISA bus. The CPC 164 is connected to the transfer controller 144 over the compatibility data lines CD and the compatibility control lines CC. The CPC 164 is provided so that the software which was written for previous computer systems, which do not have a disk array controller 112 and its BMIC 142, which are addressed over an EISA specific space and allow very high throughputs, can operate without requiring a rewriting of the software. Thus, the CPC 164 emulates the various control ports previously utilized in interfacing with hard disks.

One means of implementing posted READ operations within the present invention is through the use of a modified device driver software, special processor registers 59, processor register address decoding logic 51 and trap logic 300.

The individual registers in the special processor registers 59 can be indirectly accessed through an actual EISA memory or I/O space address. In the computer system C, I/O addresses are 16 bits in length and memory space addresses are 32 bits in length, with the M/IO* signal serving a differentiation function. The actual addresses are translated by the processor register decoding logic 51 into 4 re-encoded address lines referred to as the processor register select lines, PRS <3:0>. The translation involves decoding the full 16 bit or 32 bit register addresses into their respective decoded address signals. These decoded address signals are then encoded to form the PRS <3:0> lines.

The processor register address decoding logic 51 contains standard address decoding logic that generates an appropriate decoded address signal representing the I/O or memory address of the particular register being referenced. Because the details of the combinational logic used in the processor decoding logic 51 to perform the actual detection of a particular address value from the addresses lines LA and XA are well known to those skilled in the art, the details of the logic circuitry required to generate these decoded signals have been omitted for the purposes of clarity and only the final output of the decodes are discussed herein. The specific decoded address signals and their subsequent encoding to form the PRS <3:0> signals are described in detail on pages 8–11 of European Patent Office (EPO) Publication No. 0426161.

Referring to EPO Publication No. 0426161, the preferred apparatus embodiment of the present invention requires four additional decoded address signals from processor register address decoding logic 51, the 80C04EN signal, which represents that the memory address 80C00004h is being provided; the 80C06EN signal, which represents that memory address 80C00006h is being provided; the 80C08EN signal, which represents that memory address 80C00008h is being provided; and the 80C0AEN signal, which represents that memory addressed 80C0000Ah is being provided.

FIG. 4 is a table showing the encoding of the PRS <3:0> signals for the special processor registers 59. The computer system of FIGS. 1 and 2A–B does not include a second CPU, as illustrated in FIG. 4 and EPO Publication No. 0426161. However, the table of FIG. 4, showing two processors, is included for the sake of completeness. The preferred embodiment of the present invention utilizes a limited subset of the special processor registers 59. The low portion A<15:8> of the low memory protection address is stored in a register at address 80C00004h when PRS <3:0> lines have a signal value of 1001. The high portion A<23:16> of the low memory protection address is stored in a register at address 80C00006h when PRS <3:0> lines have a signal value of 1010. Similarly, the low and high portions of the high memory protection address are stored in registers 80C00008h and 80C0000Ah when PRS <3:0> lines have a signal value of 1011 and 1100, respectively. The PRS <3:0> signal value of 1111 indicates that no register has been selected, thus, there are 15 available locations using the 4 bits of the PRS <3:0> address. However, the use of a greater number of PRS lines to address a greater number of registers is also contemplated.

The processor register address decoding logic 51 also utilizes certain control signals to aid in the generation of the PRS <3:0> lines. The control signals used are the same as those discussed in U.S. application Ser. No. 431659 EPO Publication No. 0426161. Accordingly, some signals will refer to a second processor. However, it should be understood that a second processor is not required for the operation of the present invention.

The control signals used include AEN0 and AEN15 signals and the P1ON and P2ON signals. The P1ON and P2ON signals represent whether CPU1 or CPU2 (not shown), respectively is currently active. As shown in FIG. 4, address XXXX00F0h has two possible PRS translations depending on whether CPU1 or CPU2 is accessing the address, and the P1ON and P2ON signals on used to differentiate between the two cases. The AEN0 and AEN15 signals are EISA signals which, when low, represent that a system board I/O space access is occurring.

Figure 5:
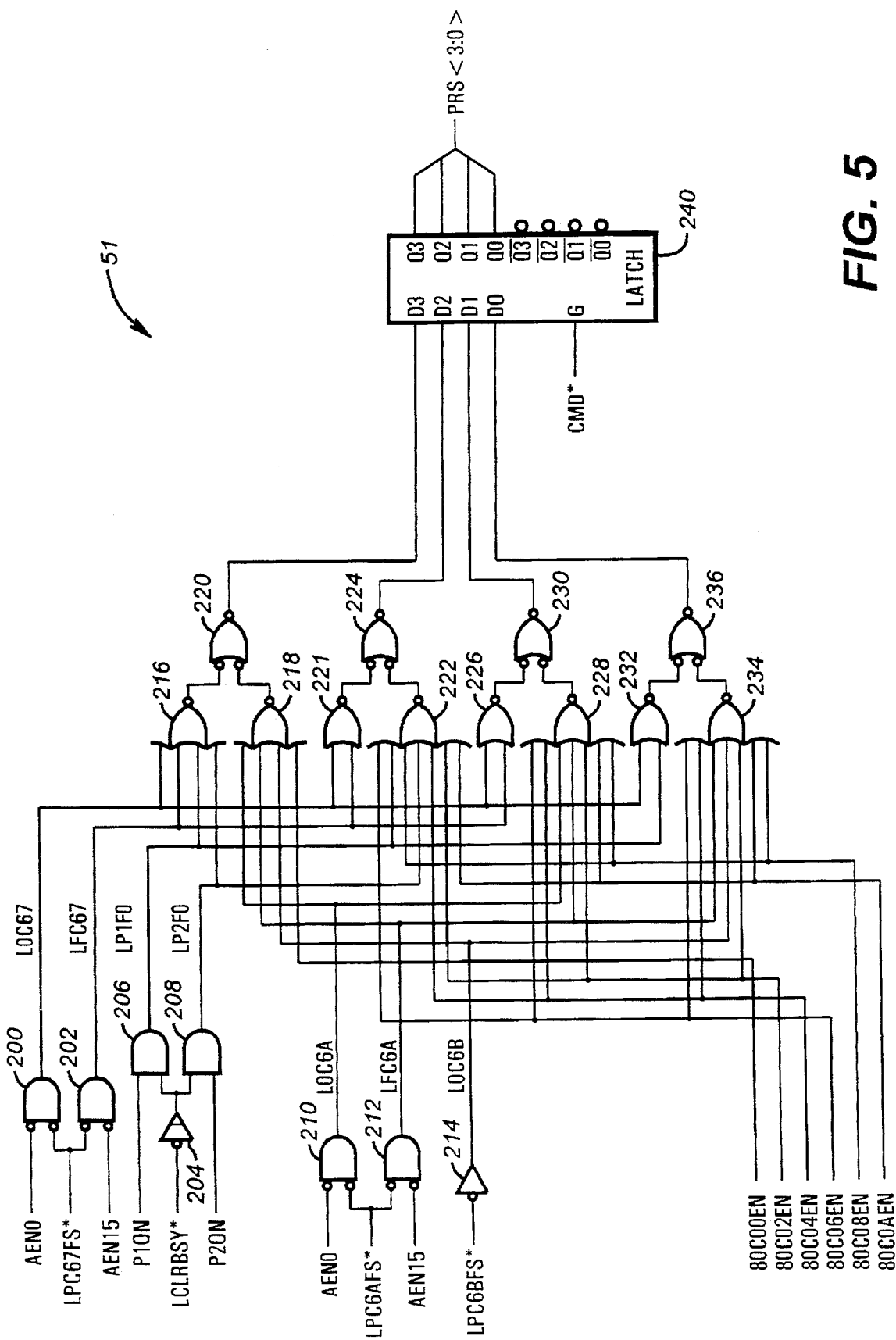
FIG. 5 is a schematic diagram of the encoding procedure used within the apparatus of the preferred embodiment of the present invention.

Referring now to FIG. 5, the processor register address decoding logic 51 utilizes the above mentioned decoded address signals and control lines to generate the PRS <3:0> lines. It will be appreciated that FIG. 5 includes logic directed to generating signals on PRS <3:0> lines which are utilized in a multi-processor computer system. The signals which relate to a multi-processor computer are not relevant to the present invention and are included only for the sake of completeness.

The AEN0 signal and the LPC67FS* signal are connected to the inputs of a 2-input NAND gate 200, whose output is a signal reference to as L0C67. The L0C67 signal represents, when asserted, that I/O port address 0C67h is being accessed. Thus, the AEN0 signal is being used to qualify the address as an I/O address. The LPC67FS* signal and the AEN15 signal are connected to the inputs of a 2-input NAND gate 202, whose output is a signal referred to as LFC67. The LFC67 signal represents, when asserted, that port address FC67h is being accessed. The LCLRBSY* signal is connected to the input of an invertor 204, whose output is connected the input of a 2-input AND gate 206, the second input of which is the P1ON signal. The output of the 2-input AND gate 206 is a signal referred to as LP1F0 which represents, when asserted, that CPU1 is accessing port address 00F0h, which clears the numeric coprocessor error interrupt of the CPU1 coprocessor. The output of the invertor 204 and the P2ON signal are inputs to a 2-input AND gate 208, whose output is a signal referred to as LP2F0. The LP2F0 signal represents, when asserted, that CPU2 is accessing port address 00F0h, which clears the interrupt of the CPU2 coprocessor, when present. Thus, the processor register address decoding logic 51 is capable of instructing both CPU1 and CPU2 to clear their related numeric coprocessor interrupts by writing to the same address, thus not requiring that software running on the system determined the processor on which it is running.

The LPC6AS* signal and the AEN0 signal are connected to the inputs of a 2-input NAND gate 210, whose output is a signal referred to as L0C6A. The L0C6A represents, when asserted, that I/O port address 0C6Ah is being accessed. The LPCAFS* signal and the AEN15 signal are connected to the inputs of a 2-input NAND gate 212, whose output is a signal referred to as LFC6A. The LFC6A signal represents, when asserted, that port address I/O FC6Ah is being accessed. The LPC6BFS* signal is connected to the input of an inverter 214, whose output is a signal referred to as L0C6B. The L0C6B signal represents, when asserted, that I/O port address 0C6Bh is being accessed.

The L0C67 signal, the LFC67 signal, the LP1F0 signal, and the LP2F0 signals are inputs to a 4-input NOR gate 216. The L0C6A signal, the LFC6A signal, the L0C6B signal and the 80C00EN signal are inputs to a 4-input NOR gate 218. The outputs of the 4-input NOR gates 216 and 218 are connected to the inputs of a 2-input NOR gate 220. The L0C67 signal and the LFC67 signal are inputs to a 2-input NOR gate 221. The LP1F0 signal, the LP2F0, the 80C02EN signal, the 80C04EN, the 80C06EN signal, the 80C08EN signal and the 80C0AEN signal are inputs to a 7-input NOR gate 222. The outputs of the 2-input NOR gate 221 and the 7-input NOR gate 222 are connected to the inputs of the 2-input NOR gate 224. The L0C67 signal and the LFC67 signal are inputs to a 2-input NOR gate 226. The L0C6A signal, the LFC6A signal, the L0C6B signal the 80C02EN signal, the 80C04EN signal, the 80C06EN signal, the 80C08EN signal and the 80C0AEN signal are inputs to a 7-input NOR gate 228. The outputs of the 2-input NOR gate 226 and the 7-input NOR gate 228 are connected to the inputs of a 2-input NOR gate 230. The L0C67 signal and the LP1F0 signal are inputs to a 2-input NOR gate 232. The L0C6A signal, the L0C6B signal, the 80C02EN signal, the 80C04EN signal, the 80C06EN, the 80C08EN and the 80C0AEN signal are inputs to a 7-input NOR gate 234. The outputs of the 2-input NOR gate 232 and the 7-input NOR gate 234 are connected to the inputs of a 2-input NOR gate 236.

The outputs of the 2-input NOR gates 220, 224, 230, and 236 are connected to the D3, D2, D1 and D0 inputs, respectively, of a 4-bit latch 240. The Q3, Q2, Q1 and Q0 outputs of the 4-bit latch 240 generate the PRS <3>, PRS <2>, PRS <1>, and PRS <0> signals, respectively. The CMD* signal, which is a timing control signal on the EISA bus 46 and indicates that the data portion of the cycle is active, is connected to the gating input of the 4-bit latch 240. Therefore, the PRS outputs are latched on the falling edge of the CMD* signal and remain latched until the next rising edge of the CMD* signal.

Figure 6:
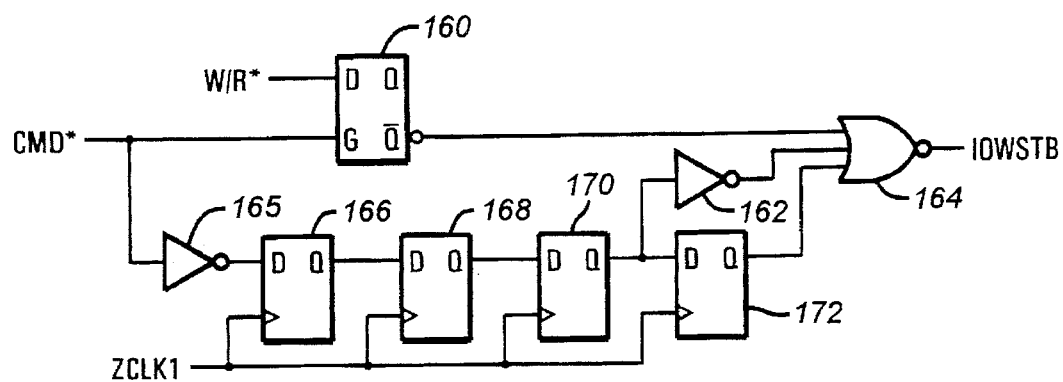
FIG. 6 is a schematic diagram of the generation of a control signal within the preferred embodiment of the present invention.

Referring now to FIG. 6, the decoding logic associated with the special processor registers 59 is used to generate appropriate decode signals PRS <3:0> lines which access the special memory protection registers. Timing and control for the decoding is provided by the EISA signal CMD*, which is a timing control signal used within the cycle, and a WRITE/READ signal referred to as W/R*. The signals are used an to generate the I/O WRITE strobe signal referred to as IOWSTB. The W/R* signal is connected to the D-input of the latch 160, whose inverted Q-output is connected to the input of a 3-input NOR gate 164. The CMD* signal is connected to the gating input of the latch 160.

The CMD* signal is also connected to the input of an invertor 165 whose output is connected to the input a D-type flip-flop 166, whose Q-output is connected to the D-input of a D-type flip-flop 168, whose Q-output is connected to the D-input of a D-type flip-flop 170, whose Q-output is connected D-input of a D-type flip-flop 172. The Q-output of the D-type flip-flop 170 is also connected to the input of an invertor 162, whose output is connected to an input of the 3-input NOR gate 164. The Q-output of the D-type flip-flop 172 is also connected to an input of the 3-input NOR gate 164. A clocking signal referred to as ZCLK, which as a duty cycle of 75% with the frequency equivalent to that of the system clock and a rising edge which coincides with the rising edge of the system clock, is connected to the clocking inputs of the D-type flip-flops 166, 168, 170 and 172. The output of the 3-input NOR gate 164 is a write strobe signal referred to as IOWSTB. The IOWSTB signal is asserted 3 ZCLK signal cycles after the CMD* signal is asserted low during a WRITE cycle, and the IOWSTB signal remains asserted for 1 ZCLK signal cycle.

Figure 7A:
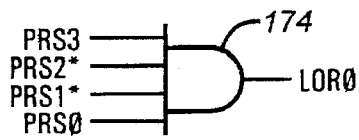
FIGS. 7A–7D are schematic diagrams of the circuitry for generation of the special register WRITE enable signals within the preferred apparatus embodiment of the present invention.

FIGS. 7A–7D are schematics for the generation of WRITE enable signals to the address range protection registers in special processor registers 59. Referring to FIG. 7A, the PRS <3> signal, the PRS <2>* signal, the PRS <1>* signal and the PRS <0> are inputs to a four-input AND gate 174, the output of which is a signal referred to as LOR0 which represents, when asserted, that the device driver has placed address bits A <15:8> of the low memory range boundary protection address to the data bus XD. It will be appreciated by one skilled in the art that a full 32 bit address is not required to reference all memory addresses located in RAM memory 58. Consequently, the preferred embodiment of the present invention utilizes address bits A <23:8> when referencing boundary protection addresses in memory. This results in a 256 byte address granularity, which is acceptable as the minimum disk transfer is preferably performed in 512 byte groups. When the LOR0 signal is asserted, it represents that the processor 20 placed low memory boundary protection address bits A <15:8> on the XD bus.

Figure 7B:
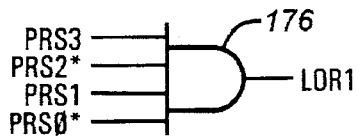

In FIG. 7B the PRS <3> signal, the PRS <2>* signal, the PRS <1> and the PRS <0>* are inputs to 4-input AND gate 176 which has an output LOR1, which, when asserted, represents that address bits A<23:16> of the low memory boundary protection address are on data bus XD. Thus, in order to store the address bits A<23:8> of the low memory boundary protection address, the device driver must make two WRITE operations to the special processor register 59 addresses 80C00004h and 80C00006h to store the full address.

Figure 7C:
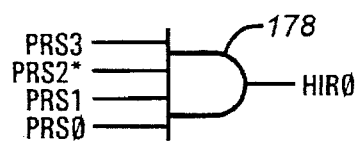

In FIG. 7C, the PRS <3> signal, the PRS <2>* signal, the PRS <1> signal and the PRS <0> signals are inputs to a 4-input AND gate 178, which has an output of HIR0 which, when asserted, represents that the device driver has placed on the XD bus address bits A <15:8> of the high memory boundary protection address.

Figure 7D:
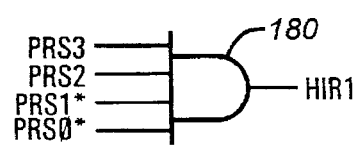

Referring to FIG. 7D, the PRS <3> signal, the PRS <2> signal, the PRS <1>* signal and the PRS <0>* signal are inputs to a 4-input AND gate 180 which has an output of HIR1 which, when asserted, represents that the device driver has placed address bits A <23:16> of the high memory boundary protection address on data bus XD. Thus, the device driver again requires two full WRITE operations to store the high memory boundary protection address bits A<23:8> in registers 80C00008h and 80C0000Ah.

Figure 8:
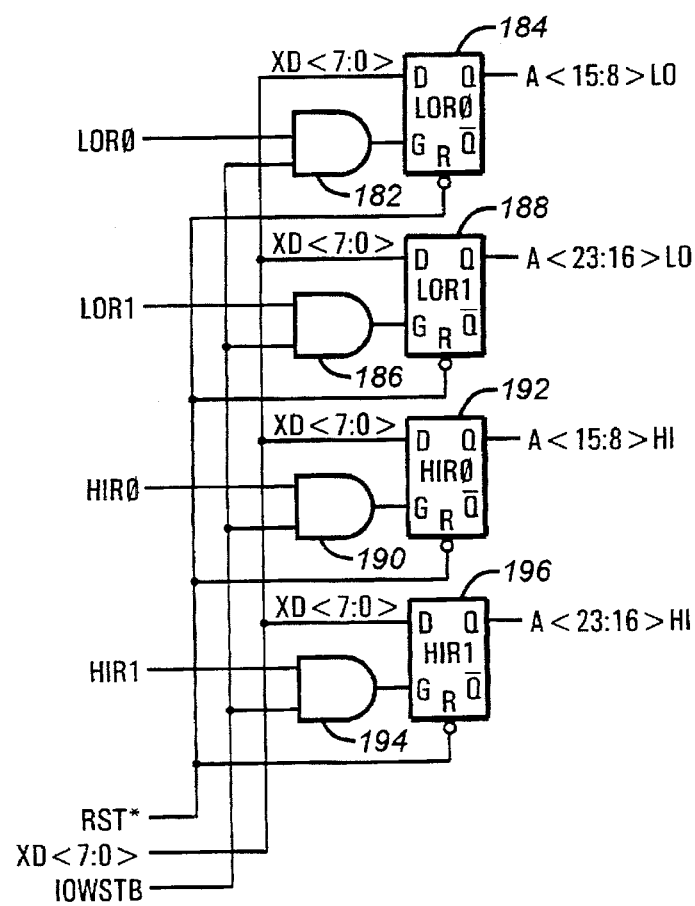
FIG. 8 is a schematic diagram of the means for storing memory boundary protection addresses within the apparatus of the preferred embodiment of the present invention.

In FIG. 8, the above decoded signals from the PRS <3:0> lines are used to access the respective boundary protection registers. The following description is included to demonstrate how the memory registers are accessed. The registers are loaded from the XD data bus represented by the appropriate data lines XD <7:0>. The data bus XD <7:0> is connected to the D7, D6, D5, D4, D3, D2, D1 and D0 inputs, respectively, of the latches 182, 186, 190 and 194 for storage of the high and low memory boundary protection addresses. The LOR0 and the IOWSTB signals are input to a 2-input AND gate 182, whose output is the gating signal for latch 184. When the device driver places address bits A <15:8> of the low memory boundary protection address on data bus XD <7:0> and IOWSTB and LOR0 are asserted, the low portion of the memory boundary address protection address A <15:8> are stored in latch 184, whose outputs Q7–Q0 are the data bits XD <7:0>, respectively. The LOR1 and the IOWSTB signals are inputs to a 2-input AND gate 186, which operates as the gating input for latch 188. When the device driver places the high portion of the low memory boundary protection address A <23:16> on data bus XD <7:0> and the LOR1 and IOWSTB signals are asserted, the high portion of the low memory boundary protection address A <23:16> is stored in latch 188.

The HIR0 and IOWSTB signals are inputs to a 2-input AND gate 190 which operates as the gating input for latch 192. When the device driver places the low portion of the high memory boundary protection address A <15:8> on data bus XD <7:0> and the HIR0 and IOWSTB signals are asserted, the low portion of the high boundary memory protection address A <15:8> is stored in latch 192. The HIR1 signal and the IOWSTB signal are inputs to a 2-input AND gate 194, whose output acts as the GATING signal for latch 196. When the device driver places the high portion of the high memory boundary protection address A <23:16> on data bus XD <7:0> and the HIR1 and IOWSTB signals are asserted, the high portion of the high portion of the memory boundary protection address A <23:16> is stored in latch 196.

A dedicated reset line RST* from disk controller 112 (FIG. 2) is in signal communications with the reset input for latches 184, 188, 192 and 196. When the disk controller 112 completes the actual transfer of data from the disk to memory 58, the disk controller 112 will issue a reset signal RST*, confirming disk data transfer, which will reset and clear latches 184, 188, 192 and 196.

Thus, the memory protection addresses for the low boundary of the data transfer and the high boundary of the data transfer are stored in latches 184, 188, 192 and 196 within the present invention. Further, the device driver will issue an instruction to the processor 20 to issue a cache flush control signal which will cause the cache controller 24 to invalidate the cache table directory entries. This is accomplished by the device driver issuing the necessary address and control signals to generate a 1000 on the PRS <3:0> lines. This will result in a write to the special processor register 59 address 80C00002, which instructs the processor 20 to flush the cache controller 24. A WRITE to this register will result in the cache controller 24 invalidating all cache table entries, effectively flushing the cache. This insures that the cache controller will not attempt to provide the disk READ request from cache memory.

The device driver will then issue the necessary READ command including addresses and signals. In the preferred embodiment, the device driver will issue a command list of the type described in U.S. patent application Ser. No. 431,737.

When the current task requests a disk READ, the device driver will store the memory boundary protection addresses in the special processor registers 59 and will flush the cache by invalidating all cache table entries through cache controller 24. The device driver will then issue the READ command list to the disk controller 112. The device driver will then, preferably, release control of the processor 20 as if it has completed the disk to memory transfer. Alternatively, the device driver may wait until it receives an early completion signal from the disk controller 112. In such instance, the disk controller 112 receives the command list and issues an early READ completion signal to the device driver. Upon receipt of the READ complete signal, the device driver will release control of processor 20 to resume processing the current task. The disk controller 112 will then process the command list and transfer the data to memory 58 via BMIC 142 or CPC 164.

Figure 9:
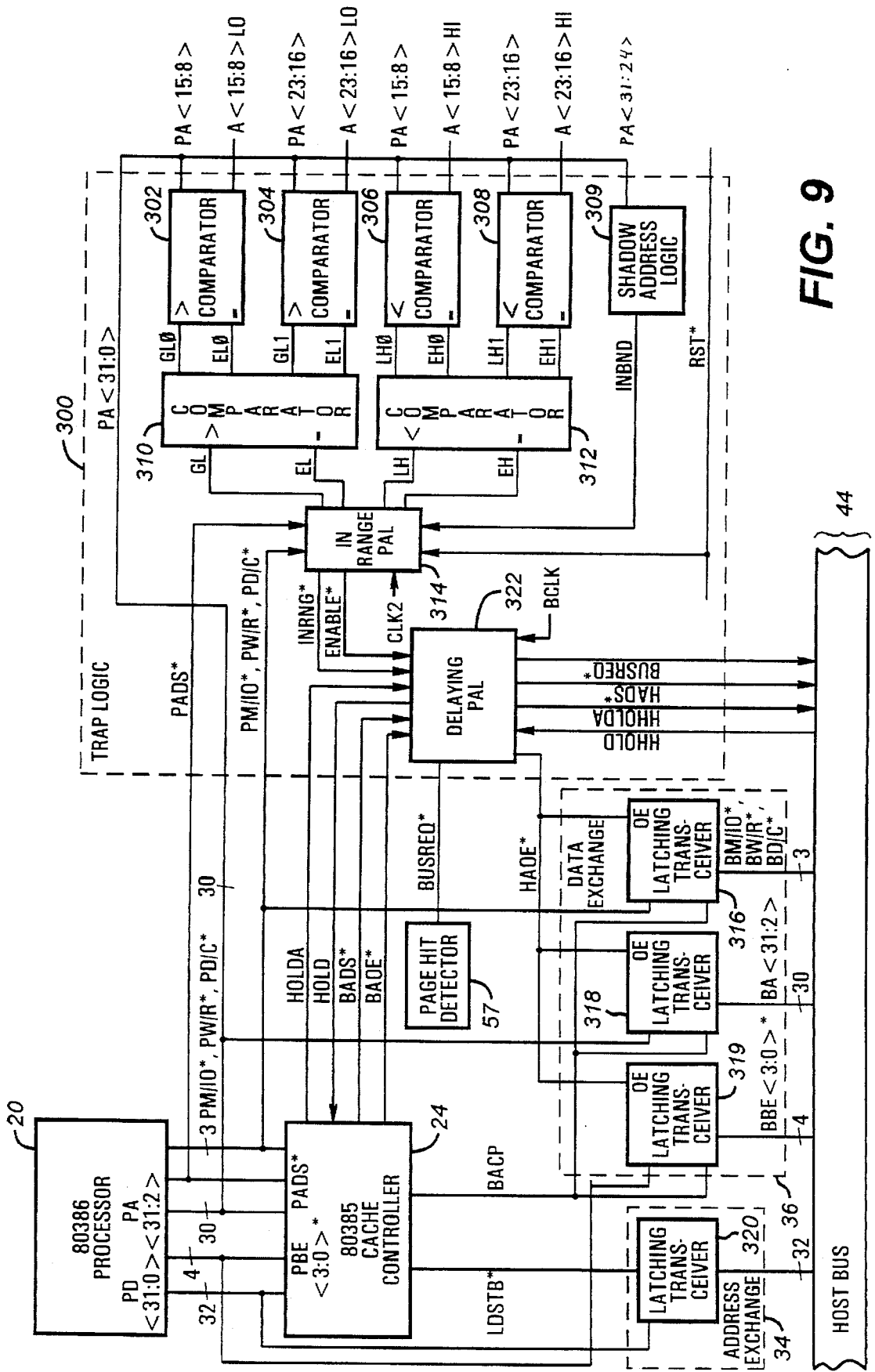
FIG. 9 is a schematic diagram of the comparator and trap logic together with the processor and cache controller interface within the preferred apparatus embodiment of the present invention.

FIG. 9 is a block diagram showing a simplified interface between the processor 20, the cache controller 24, address exchange 34, data exchange 36 and the trap logic 300 within the preferred apparatus embodiment of the present invention. The block diagram of FIG. 9 has been simplified for the purposes of clarity and it will be appreciated by one skilled in the art that there exist various other elements and signals in the processor 20 cache controller 24 interface which are not shown. The conventional processor 20 and cache controller 24 interface is well known in the art and is described in *Microprocessor and Peripheral Handbook, Vol. I*, Intel Corporation, pp. 4-303-09 (1989).

The trap logic 300 operates when a memory READ cycle is requested by the current task. In response to the request, the processor 20 will issue the PD/C* signal, the PM/IO* signal, the PW/R* signal, the PADS* signal, the desired memory address PA<31:2> and byte enable signals BE <3:0>*.

Signal PM/IO* is a cycle definition signal generated by processor 20. When PM/IO* is high, a memory access cycle is indicated; when PM/IO* is low, an input/output cycle is indicated. The PW/R* signal is also a cycle definition signal generated by processor 20, which, when high, is used to indicate a WRITE cycle and, when low, is used to indicate a READ cycle. The PD/C* signal is a third cycle definition signal generated by the processor 20 and is used to indicate a data cycle, when high, and a control cycle, when low. The PADS* signal is the address status signal, sometimes referred to as the address data strobe, which is generated by the processor 20 and is used to indicate that a valid bus cycle definition (PM/IO*, PW/R* and PD/C*) and address (PA <31:2> and BE <3:0>*) are being driven by the processor 20. The PADS* signal is often used to load the address from the host bus 44 into the MMU 62.

In the preferred embodiment, the processor address bits PA <15:8>, and the A <15:8> of the low memory boundary protection address stored in register 80C00004h are inputs to a comparator 302. The comparator 302 issues signal GL0, which, when active, indicates that the processor address bits PA <15:8> are greater than the low memory boundary protection address bits A <15:8>. The comparative logic used in comparator 302 and other comparators hereunder is well known to those skilled in the art and will not be discussed in detail. The comparator 302 also has as an output the EL0 signal, which, when active, indicates that the processor address bits PA <15:8> are equal to the address bits A <15:8> of the low memory boundary protection address, as stored in latch 184.

Similarly, the processor address bits PA <23:16> and address bits A <23:16> of the low memory boundary protection address, as stored in latch 188, are inputs to a comparator 304. One output of comparator 304 is the signal GL1, which, when active, indicates that the processor address bits PA <23:16> are greater than the low memory boundary protection address bits A <23:16> stored in latch 188. The signal EL1 is also an output from comparator 304, which, when active, indicates that the processor address bits PA <23:16> are equal to the address bits A <23:16> of the low memory boundary protection address stored in latch 188.

Processor address bits PA <15:8> and high memory boundary protection address bits A <15:8>, as provided by latch 192, are inputs to a comparator 306. Comparator 306 has as outputs signals LH0 and EH0. LH0 is active when the processor address bits <15:8> are less than the address bits A <15:8> of the high memory boundary protection address stored in latch 192. The EH0 signal is active when processor address bits PA <15:8> are equal to the address bits A <15:8> of the high memory boundary protection address stored in latch 192.

Processor address bits PA <23:16> and address bits A <23:16> of the high memory boundary protection address are inputs to a Comparator 309. Comparator 309 has as its outputs signals LH1 and EH1. LH1 is active when the processor address bits PA <23:16> are less than the address bits A <23:16> of the high memory boundary protection address stored in latch number 196. Signal EH1 is active when the processor address bits PA <23:16> are equal to the address bits A <23:16> of the high memory boundary protection address stored in latch 196.

Processor address bits PA <32:24> are inputs to logic 309, which has as an output, the signal INBND. Logic 309 is used to eliminate shadow addresses when performing protected range memory comparisons. It will be appreciated that as only bits PA <23:8> are compared, there exist 255 possible shadow addresses higher than the first 256 Mbyte having the same address bits PA <23:8>. The processor address bits PA <31:24> are compared to the address bit values 0000 0000. When the processor address bits PA <31:24> have the value 0000 0000, the INBND signal is active. Thus, any value greater than 0000 0000 would result in an address greater than the first 256 Mbyte, which exceeds the normal range of RAM memory within a computer system according to the preferred embodiment. The signal INBND is used to avoid trapping any of the 255 possible higher shadow addresses. While this limits the use of the present invention to the first 256 Mbytes of memory in the preferred embodiment, this is considered acceptable. Alternately, additional latches and comparators could be utilized.

Comparator 310 has as its inputs signals GL0, EL0, GL1 and EL1. Comparator 310 consolidates the inputs to determine if the processor address bits PA <23:8> are greater than or equal to the low memory boundary protection address A <23:8> based on input signals GL0, EL0, GL1 and EL1. The outputs of comparator 310 are the signals GL, which indicates that the processor address bits PA <23:8> are greater than the low memory boundary protection address A <23:8>, and the signal EL, which indicates that the processor address bits PA <23:8> are equal to the low memory boundary protection address.

As noted previously, it is not necessary for the present invention to make a full 32-bit address comparison, as all 32 bits are not utilized when addressing memory 58 within the computer system illustrated in FIGS. 1 and 2A–B. Further, the current protection address scheme insures a granularity size of 256 bytes, which is less than the minimum 512 byte disk transfer size. However, the use of additional registers for the storage of additional address bits and additional comparators to perform full 32 bit address comparison are contemplated within the present invention.

Comparator 312 has as its input signals LH0, EH0, LH1 and EH1. Comparator 312 consolidates the signals to determine whether the processor address <23:8> bits are less than or equal to the address bits A <23:8> of the high memory boundary protection address as stored in latches 192 and 196. The outputs of comparator 312 are the signals LH and EH. When signal LH is active, it indicates that the processor address PA <23:8> is less than the high memory boundary protection address A <23:8>. When signal EH is active, it indicates that the processor address PA <23:8> is equal to address bits A <23:8> of the high memory boundary protection address stored in latches 192 and 196.

Programmable array logic (PAL) 314 has as its inputs signals GL, EL, LH, EH, INBND, PM/IO*, PW/R*, PD/C*, PADS*, RST* and CLK2. The RST* signal is issued across a dedicated line by the disk controller 112 (FIGS. 2A–B) and is used to indicate actual completion of the data transfer from disk to memory.

The three cycle definition signals (PM/IO*, PW/R* and PD/C*) and the address status signal PADS* are used to qualify the operation of the trap logic 300 of the preferred embodiment. It will be appreciated that the trap logic 300 is intended to operate only in those instances when a memory READ operation is being attempted. Thus, the PAL 314 utilizes the cycle definition signals and the address status signal to determine if a memory READ operation to a protected address is in process.

Also utilized is the signal CLK2, which is the internal system clock and provides fundamental timing for the processor 20 and the execution of instructions. The CLK2 signal has a frequency of twice that of the nominal processor speed. For instance, a computer system having a nominal processor speed of 20 MHz would have a CLK2 speed of 40 MHz. The CLK2 signal itself is divided by two by both the processor 20 and the cache controller 24 to generate an internal phase indication clock. The CLK2 period whose rising edge drives the internal clock low is called the PHI1 and the CLK2 period that drives the internal clock high is called the PHI2.

PAL 314 consolidates the information expressed in signals GL, EL, LH, EH, INBND and the cycle definition and address strobe signals to generate two output signals: INRNG* and ENABLE*. When signal INRNG* is active, it indicates that the processor address PA <31:2> is within the protected boundary address range stored in latches 184, 188, 192 and 196 during a memory READ operation and the protection circuitry is not disabled. The output signal ENABLE* indicates that the processor address PA <31:2> is within the 256 Mbyte range of addressable RAM during a processor memory READ operation.

The logic equations for PAL 314 are expressed herein symbolically. The "•" symbol is the logic "AND" operation and the "+" symbol is the logic "OR" operation. A bar across the top of a term is used to indicate that the term is in its logic low state. If the terms on the right side of the "=" symbol in the equation are true, then the output is true on an asynchronous basis. If the terms on the right side of the ":=" in the equation are true at the rising clock signal edge, then the output signal is true after the rising clock signal edge. This is commonly referred to as a registered operation. The logic equations for PAL 314 are as follows:

INRNG*:=(EL+GL)•(EH+LH)•$\overline{(EL•EH)}$•INBND•PM/IO*•PD/C*•$\overline{PW/R^*}$ ENABLE*:=INBND•PM/IO*•PD/C*•$\overline{PW/R^*}$ where the PADS* signal is combined with the CLK2 signal to provide a rising edge coincident with the CLK2 signal in a PHI2 state of an 80386 to provide the clock input of the flip-flops within PAL 314 and where the RST* signal is provided to the asynchronous reset of the flip-flops within PAL 314. Therefore, the INRNG* signal is active or asserted low during memory data READ cycles within the first 256 Mbytes, the processor address is within the protected address boundaries and the processor address is not simultaneously equal to both the high and low boundary addresses, indicating that the protection is not disabled.

The PD/C* signal, the PM/IO* signal and the PW/R* signal are also inputs to a latching transceiver 316, the transceiver, having a gating signal BACP. The BACP signal is the Bus Address Clock Pulse, which is generated by the cache controller 24, and the PD/C*, PM/IO* and PW/R* signals are latched into transceiver 316 on a rising edge of signal BACP. Latch 316 has as its outputs the signals, BD/C*, BM/IO* and BW/R*, which are driven onto the host bus 44 upon receipt of output enable signal HAOE*, which is generated by the trap logic 300, as will be discussed further below.

The full processor address PA <31:2> is an input to transceiving latch 318, which also has the BACP signal as its gating signal. The address is latched into transceiver 318 upon receipt of the BACP signal. Latch 318 has as its output the bus address BA <31:2>, which is also driven to the host bus upon receipt of the signal HAOE*.

The processor 20 byte enable signals PBE <3:0>* are inputs to a transceiving latch 319. The byte enable bits PBE <3:0>* are latched into transceiver 319 on a rising edge of the BACP signal. Latch 319 has as its outputs, the byte enable signals BBE <3:0>*, which are driven to the host bus 44 upon receipt of the HAOE* signal.

Processor data lines PD <31:0> are inputs to a transceiving latch 320, which has the signal LDSTB* as its gating signal. The LDSTB* signal is the load data strobe signal generated by the cache controller 24 and is used to latch in outbound data, as in a WRITE operation. Transceiving latch 320 is not required for the enablement of the present invention and is included herein only for the sake of completeness.

Thus, the conventional processor 20/cache controller 24 interface provides for the latching of the necessary processor address and cycle definition signals required to perform the memory READ operation. The trap logic 300 is utilized within the preferred embodiment to prevent the control signals and address from reaching the host bus 44 during trapped operations. Further, trap logic 300 permits the preferred embodiment to initiate bus arbitration and release control of the host bus 44, where required by other devices when the transfer has not completed. Trap logic 300 will also generate the necessary bus request signals to permit completion of the memory access.

PAL 322 has as its inputs the BAOE* signal, the bus address output enable signal, the BADS* signal, the bus address strobe signal generated by cache controller 24, as opposed to the processor address strobe signal PADS*, the INRNG* signal, the ENABLE* signal, the HHOLD signal, the HOLDA signal, the BUSREQ* signal and the BCLK signal.

The HOLD and HOLDA signals are generated by the cache controller 24 and are utilized in the bus arbitration process. The cache controller 24 is capable of operating in a master or a slave mode. Within the preferred embodiment, the cache controller 24 will be operating in a master mode. When in the master mode, the HOLD signal is an input to cache controller 24 which indicates that a slave device has requested ownership of the host bus 44. The HOLDA signal is an output from the cache controller 24 which acknowledges the request for bus ownership. The BUSREQ* is asserted by cache miss detector contained within the page hit detector 57 and operates as a bus request signal when a non-cache-hit cycle is detected. This will happen if the processor 20 does not receive a READY* signal after two wait states from an initial cycle or one wait state from a pipelined cycle. The issuance of the BUSREQ* signal within the preferred embodiment is assured during protected address cycles, as the device driver has previously issued a cache FLUSH signal when writing the memory boundary protection addresses to special processor registers 59, ensuring a cache READ miss. The HHOLD signal is an input to PAL 322 from host bus 44 indicating that a slave device has requested the host bus and is transmitted to the cache controller 24 as the HOLD signal. The HHOLDA signal is an output from PAL 322 to host bus 44 and corresponds to the HOLDA signal generated by cache controller 24. However, as will be explained below, the HHOLDA signal may also be delayed and regenerated by PAL 322. PAL 322 has as its outputs the HHOLDA signal, the HOLD acknowledge signal; the HADS* signal, which is the host address status signal; the BUSREQ* signal; the HOLD signal; and the HAOE* signal, the host address output enable signal. The BCLK signal is the bus clock and is used for the timing of all bus operations on the host bus 44.

The BAOE* signal is normally used to output enable transceiving latches 316, 318 and 319. However, in the preferred embodiment, the BAOE* signal is buffered and output is not enabled if the memory READ address is within the protected memory range created by the posted READ operation. This occurs when the INRNG* and ENABLE* signals, as provided by PAL 314, are active. PAL 322 issues an HAOE* signal in place of the BAOE* signal when the INRNG* and ENABLE* signals are not active, as will be explained below. Thus, the bus address (BA<31:2> and BBE<3:0>*) and the cycle definition signals (BM/IO*, BW/R* and BD/C*) are not driven onto the host bus 44, in the presence of INRNG* and ENABLE* to allow simplified bus ownership transfers during a READ posting-based delay.

The BADS* signal is an input to PAL 322, having a corresponding output signal HADS*. However, PAL 322 inhibits the output of the HADS* signal when INRNG* and ENABLE* are active. Thus, the control signals necessary to drive the address and cycle definition signals, as well as the address strobe, will not reach the host bus 44 when an attempt is made to READ a protected memory address.

The PAL 322 receives the BUSREQ* signal from page hit detector 57 and issues it as BUSREQ* to request logic 42 to begin the bus request procedure. The operation of the bus request logic of PAL 322 is set forth in the state machine of FIG. 10A. In state H1, neither the INRNG* or ENABLE* signals are active ($\overline{INRNG^*} + \overline{ENABLE^*}$). The state machine may be in state H1 when (a) the requested memory address is not a protected address ($\overline{INRNG^*}$) or (b) the requested memory address is not within the first 256 Mbyte of address space ($\overline{ENABLE^*}$).

Figure 10A:
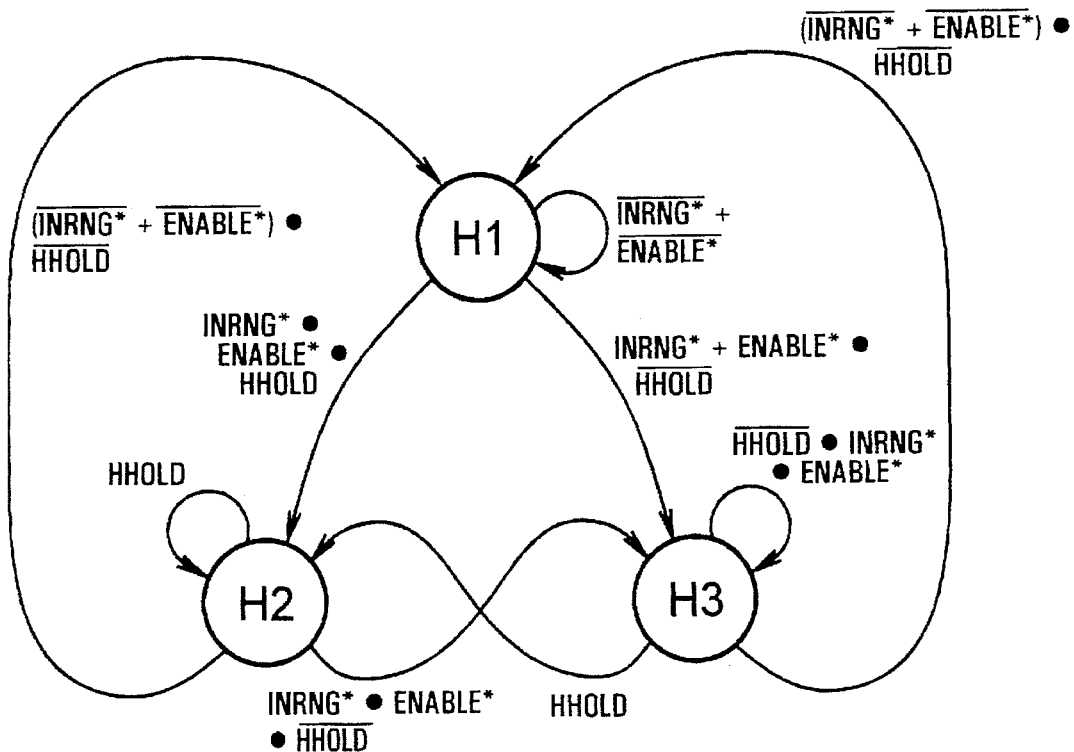
FIGS. 10A and 10B are a state machine diagram and a block diagram of a programmable array logic device setting forth the operation of the programmable logic array device for managing bus arbitration within the present invention.
Figure 10B:
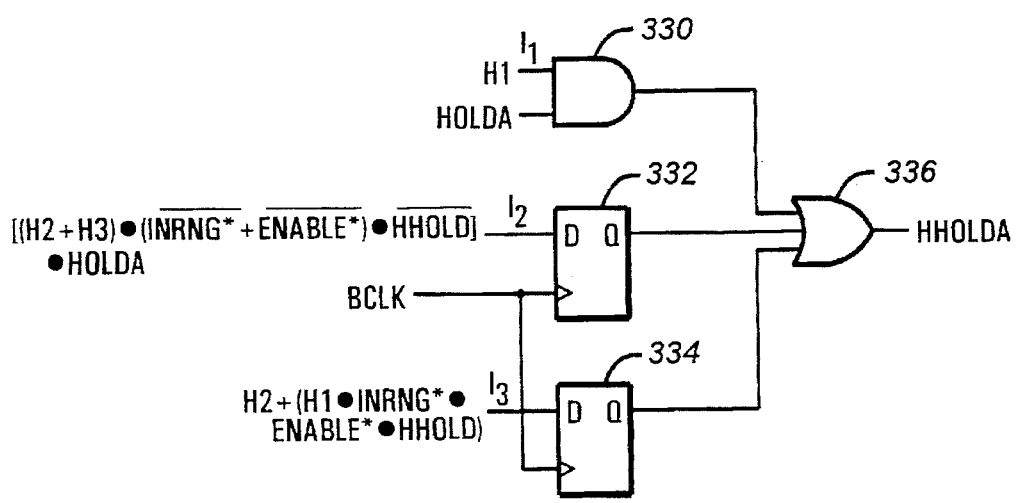

When the state machine is in state H1, the bus request acknowledgment signal, HOLDA is passed through by PAL 322 as the HHOLDA signal, which also operates similarly to HOLDA in that it acknowledges a slave device request for host bus 44 (FIG. 10B).

The state machine progresses to state H2 when the INRNG*, ENABLE* and HHOLD signals are active. The fact that the INRNG* and ENABLE* signals are active indicates that a memory READ request has been issued for a protected memory address. The active HHOLD signal indicates that the host bus 44 is currently owned or controlled by some other device. Conversely, a $\overline{HHOLD}$ signal indicates that no other device has requested the host bus 44 and the cache controller 24, in effect, owns the host bus 44. The state machine remains in state H2 as long as some other device owns the host bus 44 (HHOLD). If the cache controller 24 should be granted control of the host bus 44 when the INRNG* and ENABLE signals are still active (INRNG*•ENABLE*•$\overline{HHOLD}$), the state machine progresses to state H3.

In state H3, the cache controller 24 now owns the bus, but may not complete the memory READ cycle as the INRNG* and ENABLE* signals are still active. The state machine remains in state H3 so long as the processor 20 owns the bus and the INRNG* and ENABLE* signals are active (INRNG*•ENABLE*•$\overline{HHOLD}$). In the event that another device is granted control of the bus, the HHOLD signal will go high and the state machine will progress from state H3 to state H2.

Alternatively, the state machine may arrive at state H3 from state H1 when the INRNG* and ENABLE* signals are active and the processor 20 is granted ownership of the host bus 44 (INRNG*•ENABLE*•$\overline{HHOLD}$).

The state machine will proceed from state H2 to state H1 when the INRNG* and ENABLE* signals are inactive and the processor 20 owns the host bus 44 (($\overline{INRNG^*}$+ $\overline{ENABLE^*}$)•$\overline{HHOLD}$). This indicates that the disk to memory transfer has completed and that the RST* signal has been received from the disk controller 112, thereby setting the asynchronous reset on PAL 314. The state machine progresses back to state H1 only when the processor 20 has been granted control of the host bus 44 as it will still be unable to complete the memory READ cycle where it does not own the host bus 44 (HOLD).

The state machine progresses from state H3 to state H1 when the INRNG* and ENABLE* signals are inactive and the processor 20 owns the host bus 44 (($\overline{INRNG^*+ENABLE^*}$)•HHOLD). Again, this indicates that the disk to memory transfer has completed and that the RST* signal has been received from the disk controller 112, thereby setting the asynchronous reset on PAL 314.

FIG. 10B is a logic diagram of portions of PAL 322 for the generation of the HHOLDA bus request acknowledgment signal. The HOLDA signal is an input to a two-input AND gate 330, which has as its other input, a signal I1, which is a logic high when the state machine of FIG. 10A is in state H1. The output of AND gate 330 is an input to a three-input OR gate 336.

Flip-flop 332 has the signal I2 as an input to its D input. The signal I2 is a logic high when the following conditions are true:

[(H2+H3)•($\overline{INRNG^*+ENABLE^*}$)•$\overline{HHOLD}$]•HOLDA

Thus, I2 is high when the state machine of FIG. 10A is in state H2 or H3 and the INRNG* or ENABLE* signal are not active and the processor 20 owns the host bus 44, which, effectively places the state machine back at H1. Input I2 is clocked into flip-flop 332 by the BCLK signal. Thus, the output of flip-flop 332 stays high when the sate machine transfers to the H1 state if the cache controller 24 has not yet attempted to take control of the host bus 44. Flip-flop 332 has a Q output which is an input to three-input OR gate 336.

Flip-flop 334 has the signal I3 as an input to its D input. The signal I3 is a logic high when the following conditions are true:

H2+(H1•INRNG*•ENABLE*•HHOLD)

Thus, I3 is high when the state machine of FIG. 10A is in state H2 or the state machine is in state H1 and the INRNG* and ENABLE* signals are active and the processor 20 does not own the host bus 44, indicating a transfer to state H2. As with flip-flop 332, I3 is clocked into flip-flop 334 by the BCLK signal and has an output Q which is an input to three-input OR gate 336. The three-input OR gate 336 has as its output the hold acknowledge signal, HHOLDA, which indicates that the processor 20 has relinquished its ownership of the host bus 44. Thus, the present invention properly participates in bus control transfers.

Figure 11A:
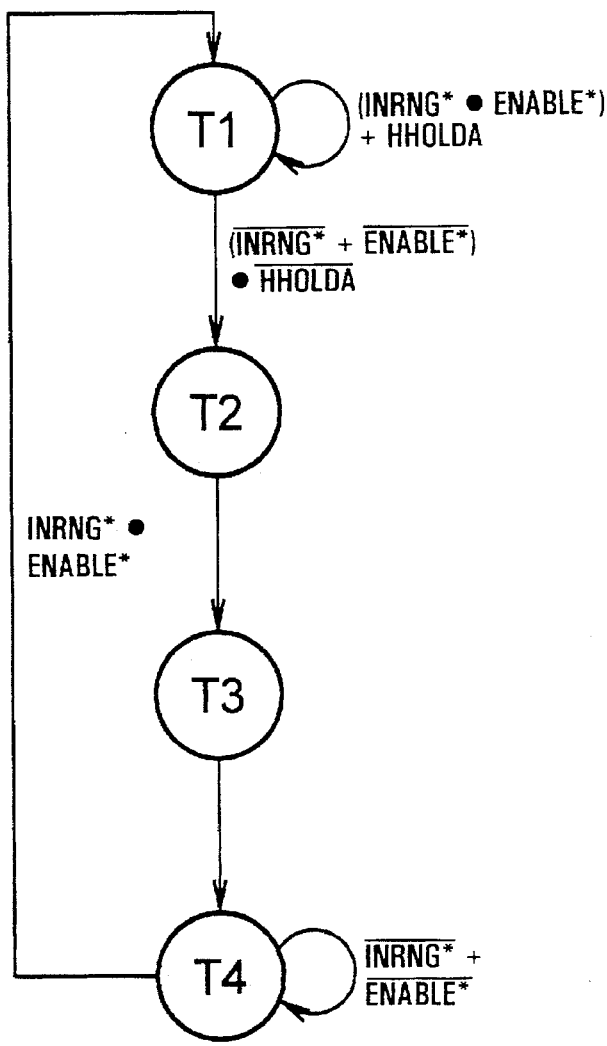
FIGS. 11A–11E are diagrams of a state machine and a block diagrams of the logic for the trapping and generation of control signals within the preferred embodiment apparatus of the present invention.

FIGS. 11A through 11E are the state machine and logic diagrams for the generation of the output enable signal HAOE*, the address status signal HADS* and the bus request signal BUSREQ*. In FIG. 11A, the state machine starts in state T1 and remains in state T1 as long as the INRNG* and ENABLE* signals are active or the processor 20 has relinquished the host bus 44. ((INRNG*•ENABLE*) +HHOLDA). The state machine progresses to state T2 when either the INRNG* or ENABLE* signals are inactive and the HHOLDA signal is not active (($\overline{INRNG^*+ENABLE^*}$)•$\overline{HHOLDA}$). This indicates that (a) the requested memory address is not a protected address or (b) the requested memory address is not within the first 256 Mbyte of addresses and the processor 20 has control of the host bus 44.

Thereafter, the state machine progresses to state T3 on the next BCLK cycle. The state machine then progresses to state T4 on the next BCLK cycle and will remain in state T4 so long as the INRNG* or ENABLE* signals are not active ($\overline{INRNG^*+ENABLE^*}$). The state machine will progress to state T1 when the INRNG* and ENABLE* signals are active.

Figure 11B:
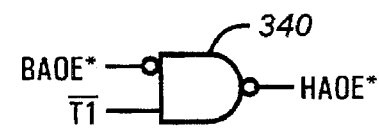

FIG. 11B is a logic diagram for the generation of the output enable signal HAOE* within PAL 322. It is considered preferable to have the CPU off the host bus 44 when the CPU is waiting for a posted READ to complete. Otherwise, the host bus 44 will be locked and various time critical operations may not occur. Therefore it is necessary to alter the BAOE* signal from the cache controller 24 to tri-state the various transceivers 316, 318 and 319 during such cycles. This also allows the HOLDA state machine to operate as illustrated, readily passing off control of the host bus 44. The signal BAOE* is first inverted and is an input to a two-input NAND gate 340. The second input to NAND gate is a signal which is a logic high when the state machine of FIG. 11A is not in state T1. The output of NAND gate 340 is the signal HAOE*, which is output by PAL 322 to transceivers 316, 318 and 319 which permits the transceivers to driver the cycle definition signals and the address onto host bus 44. Thus, in FIG. 11B the BAOE* is passed on through PAL 322 (NAND gate 340) whenever the INRNG* or ENABLE* signals are inactive and the processor 20 owns the host bus 44 (($\overline{INRNG^*+ENABLE^*}$)•$\overline{HHOLDA}$).

Figure 11C:
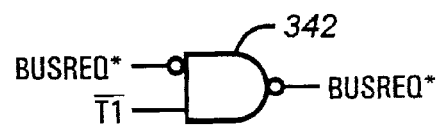

The BUSREQ* signal was used to initially request the bus, as stated in the discussion of FIG. 9. FIG. 11C represents the logic diagram for the output of the BUSREQ* signal following its initial assertion. As in FIG. 11B, the BUSREQ* signal is first inverted and is an input to a two-input NAND gate 342. As with NAND gate 340, the second input to NAND gate 342 is a logic high when the INRNG* or ENABLE* signals are inactive and the processor 20 owns the host bus 44 (($\overline{INRNG^*+ENABLE^*}$)•$\overline{HHOLDA}$). Thus, the BUSREQ* signal is passed through in all states in the state machine of FIG. 11A but T1, where it is set high so that no request is made. In this manner the CPU does not request control of the host bus 44 while waiting to complete a posted READ operation. This improves system operations by keeping an inactive unit out of the arbitration cycle.

Figure 11D:
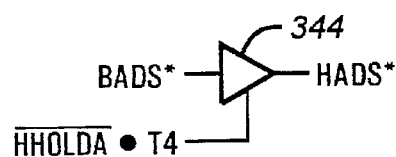

FIG. 11D is a logic diagram for the output of the host address strobe signal FADS*. It is contemplated that it will be necessary to generate a substitute BADS* signal when the memory READ attempts to access a protected address. The time required to complete the disk to memory transfer will generally exceed the time that the BADS* signal is asserted by the cache controller 24. Thus, it is necessary for the generation of a replacement address status signal which may be asserted when either INRNG* or ENABLE* go inactive, as the original BADS* signal will not have been transferred to the host bus 44 and yet the cycle will have been completed. Buffer 344 has as its input, the bus address status signal BADS* and outputs a signal HADS*. The output enable signal for buffer 344 is a signal which is a logic high when the state machine of FIG. 11A is in state T4 and the processor 20 has control of the host bus 44 (T4•$\overline{HHOLDA}$). When the state machine of FIG. 11A is in state T4, the INRNG* or ENABLE* signals are inactive ($\overline{INRNG^*+ENABLE^*}$). This permits the pass through of the BADS* signal by PAL 322 whenever the requested memory address is (a) not a protected memory address or (b) the requested memory address is outside of the first 256 Mbyte address range within the preferred embodiment and the processor 20 is controlling the host bus 44. However, the HADS* signal will not be asserted if the state machine of FIG. 11A is not in state T4, that is, the processor 20 is not operating normally, or the processor 20 does not have control of the host bus 44. Therefore, it becomes necessary to generate a substitute address status signal.

Figure 11E:
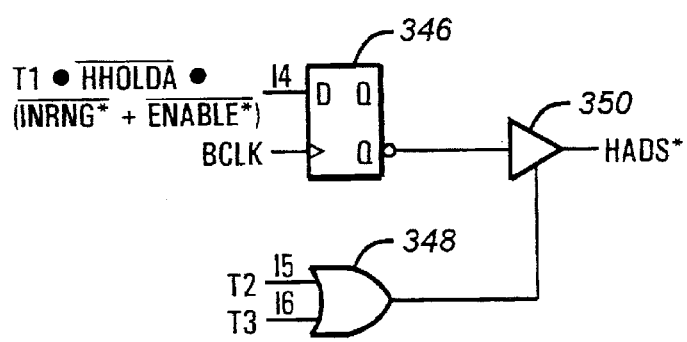

FIG. 11E is a logic diagram for the generation of a substitute HADS* signal. Flip-flop 346 has as its input to its D input the signal I4, which is logic high when the state machine of FIG. 11A is in state T1 and the processor 20 gains ownership of the host bus 44 and the INRNG* or ENABLE* signals are not active (T1•HHOLDA•( INRNG*+ENABLE*)). The I4 signal is clocked into the flip-flop 346 on BCLK. The inverted output $\overline{Q}$ of flip-flop 346 is the input to buffer 350. Thus, the output of flip-flop 346 is a logic low when the input conditions are true. An OR gate 348 has as its inputs the signals I5 and I6, which are logic highs when the state machine of FIG. 11A is in states T2 or T3, respectively. The output of OR gate 348 is an output enabling signal to buffer 350, which outputs a substitute HADS* signal. The substitute HADS* signal is generated only after the state machine of FIG. 11A leaves state T1, indicating that the memory range protection is no longer active (INRNG*+ENABLE*) and that the processor 20 owns the host bus 44 (HHOLDA). Thus, the preferred embodiment is capable of generating a new HADS* signal which indicates that the cycle definition signals and address on the host bus 44 are valid and may be loaded into the memory management unit for completion of the memory access cycle.

Thus, when the INRNG* and ENABLE* signals are generated by PAL 314, all control signals, cycle definition signals and the memory address required to complete the memory READ are not driven onto the host bus 44 and the unit will release control of the bus if necessary. When the disk controller 112 actually completes the transfer of data to memory 58, the controller 112 will issue the RST* signal on the dedicated line, which will clear latches 184, 188, 192 and 196, and enable the output of the address, cycle definition signals and control signals in PALs 316, 318, 319 and 322 necessary to complete the memory READ operation when the processor 20 has control or has regained control of the host bus 44 by arbitration.

The preferred apparatus embodiment prevents the computer system C from acting upon the memory READ request generated by processor 20 until such time as the data transfer has been completed. The preferred embodiment accomplishes this means without placing a HALT or otherwise occupying the host bus. In doing so, the preferred embodiment avoids problems associated with latency and memory refresh. Further, this embodiment of the present invention may be utilized when the processor 20 is in a pipelined address mode. The necessary circuitry to support posted READ operations in a pipelined mode may be easily determined by one skilled in the art and is not set forth herein.

It is also contemplated that the preferred embodiment may exist as software on a computer of the type illustrated in FIGS. 1 and 2A–B, without the use of special processor registers 59 to permit the use of a posted READ operations in a multi-tasking environment. An 80386 or 80486 processor is capable of running in a multi-tasking Protected Virtual Address Mode (Protected Mode) or Virtual 8086 Mode. In the protected mode, a single multi-tasking operating system, such as OS/2 or UNIX, may be used to run multiple applications tasks. In Virtual 8086 Mode, the processor runs multiple 8086 applications tasks, each of which could be running its own operating system. The particular techniques used in a protected or virtual 8086 mode multi-tasking environment are known in the art and are discussed in various reference guides, such as *Advanced 80386 Programming Techniques*, J. Turley (Osborne McGraw-Hill 1988) and *Programming the 80386*, J. Crawford, P. Gelsinger (Sybex 1987).

Figure 12:
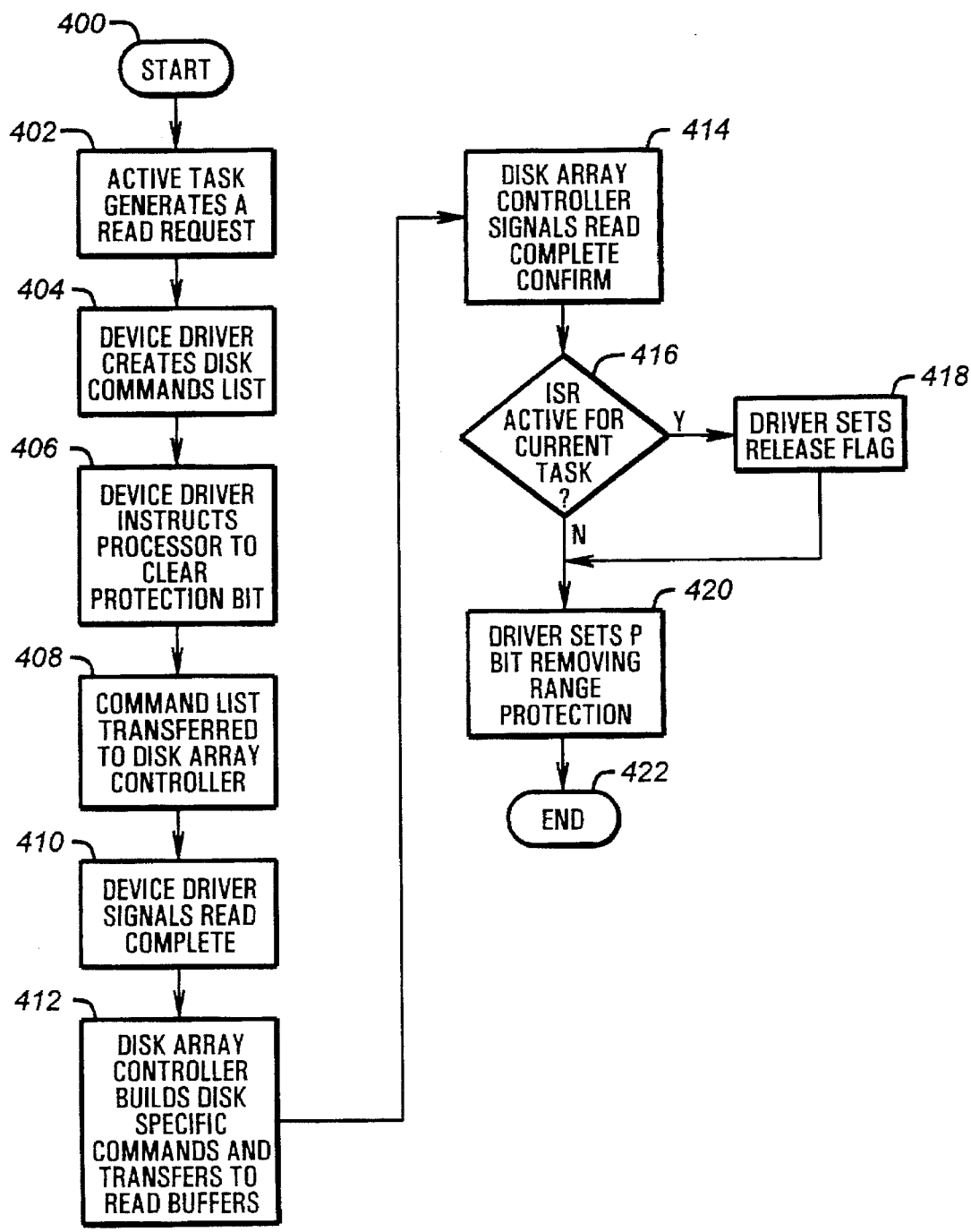
FIG. 12 is a flow diagram of the preferred software embodiment of a posted READ operation within the preferred method embodiment of the present invention.

The present invention may be implemented in software as a modified device driver and a modified Interrupt Service Routine (ISR). FIG. 12 is a flow diagram of the preferred embodiment of a software posted READ operation for a processor 20 running in multi-tasking environment. The posted READ operation begins at step 400. Control transfers to step 402, wherein the active task running on processor 20 generates a READ request to transfer data from a disk to memory 58. The READ request causes the disk device driver to assume control of the processor 20. Control transfers to step 404, wherein the device driver causes processor 20 to create a READ command list similar to that described in U.S. patent application Ser. No. 431,737 assigned to Compaq Computer Corporation, assignee of the present invention. The command list includes addresses for the deposit of the requested data and the READ buffers in memory 58. Control transfers to step 406, wherein the device driver instructs the processor 20 to clear a reserved protection bit for the page table entry(ies) corresponding to the physical memory address(es) to which data is to be transferred by the disk READ request.

The 80386 or 80486 processor 20 utilize a paging memory management technique, which modularizes programs and data into multiple uniform size "pages" of 4 kbytes. The paging mechanism of the 80386 and 80486 consists of three components: the page directory, the page tables and the page frames or page itself. The implementation of the paging scheme utilized in the 80386 and 80486 processors is well known in the art and is described in the above reference manuals and the *Microprocessor and Peripheral Handbook*, Vol. I, Intel Corporation p. 4–46 (1989). Accordingly, general familiarity of the page management techniques of the 80386 and 80486 processors will be presumed.

FIG. 13 is an illustration of a page table entry, which refers to a particular page frame in memory. A page table entry is a 32 bit entry which references a 4 kbyte section of memory. The page frame address is set forth in bits 12–31. Bit 0, the Present (P) bit indicates if a page table entry may be used for address translation. If P=1, the entry may be used for address translation; if P=0 the entry may not be used for address translation and all other bits are available for software. The preferred embodiment utilizes the Present bit in establishing protection for the memory addresses within a particular page table entry. Bit 5, the Accessed (A) bit is set by the processor 20 before either a READ or WRITE access occurs to an address corresponding to the entry. Bit 9, the DIRTY bit is undefined for page table entries and is not relevant to the present invention. Likewise, bits 1 and 2 (R/W and U/S) are dedicated to page level protection and are not relevant to the present invention. The MMU 62 checks the page table entry as part of the linear to physical address translation. If the P bit for a particular page frame entry is equal to 0, the processor 20 will be unable to access that page frame and the MMU 62 issues a page fault, which will be explained further below. Thus, by clearing the P bit to 0, the preferred embodiment provides for memory range protection in 4 kbyte increments.

Returning to FIG. 12, in step 406, the device driver instructs the processor 20 to clear the Present bit to 0 for the page table entries corresponding to the physical memory addresses to which the disk data is to be transferred. As each page table entry addresses 4 kbytes of memory, it will be appreciated that the minimum data protection granularity will be 4 kbytes, which is greater than the customary 512 byte granularity for disk transfers. Control transfers to step 408, wherein the device driver transfers the READ command list to the disk array controller 112. Control transfers to step 410, wherein the device driver signals READ complete and releases control of the processor 20, which permits the active task to continue execution.

The flow of the READ operation continues in step 412, wherein the disk array controller 112 builds disk specific command and queues them for execution by the local processor 130. The local processor 130 (FIG. 3) executes the disk specific commands and transfers the requested data to the READ buffers specified in the READ command list. This transfer is done under the control of the BMIC 142 in the preferred embodiment or the DMA controller 56 in other embodiments. It is noted that the processor 20 cannot do the transfer from the disk to the memory. When all of the disk specific commands have completed and all data transferred, READ operations progress to step 414. In step 414, the disk array controller 112 issues a READ complete confirmation signal, which may be sent to the device driver as a hardware interrupt. READ operations then transfer to step 416, wherein the device driver determines whether the current task has been interrupted as a result of an attempted memory access to a protected address. If the current task has been interrupted, control transfers to step 418, wherein the device driver sets a Release flag, indicating completion of the data transfer. The Release flag will be checked by the page fault ISR within the preferred embodiment, as will be discussed below. Control thereafter transfers to step 420. If in step 416 the device driver determines that the current task has not been interrupted, control transfers to step 420, wherein the device driver instructs the processor 20 to set the Present bit to 1 in the page table entry(ies), indicating that the page table entries are present and may be accessed. Control transfers to step 422 which completes operation of the posted READ command.

Figure 14:
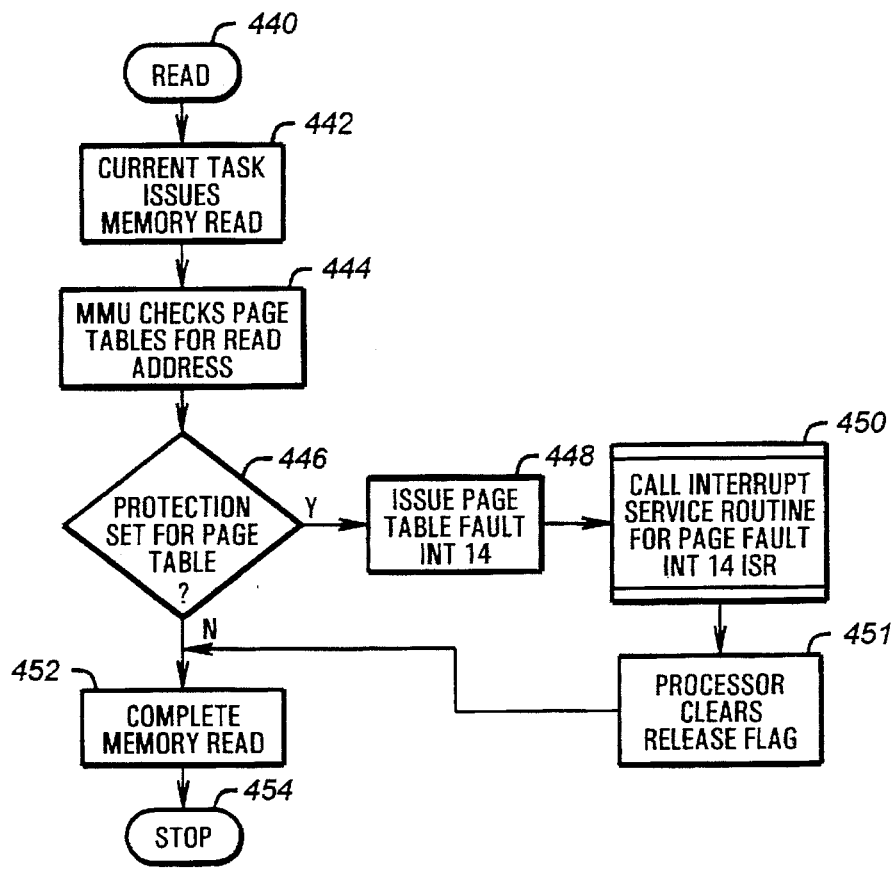
FIG. 14 is a flow diagram of a memory access following a READ within the preferred method embodiment of the present invention.

FIG. 14 is an operational flow diagram of the computer system of FIGS. 1 and 2A–B for a memory READ in multi-tasking mode within the preferred embodiment. The memory READ cycle begins at step 440. Control transfers to step 442, wherein the current task causes the processor 20 to issue a memory READ request, including the requested address and necessary control signals. Control transfers to step 444, wherein the MMU 62 automatically checks the page table entry(ies) for the memory address(es) specified by the current task in the memory READ operation. Control transfers to step 446. If in step 446, the MMU 62 determines that the memory address is within a page table entry having a Present bit equal to 0, thus indicating a protected address, control transfers to step 448, wherein the MMU 62 generates a page fault interrupt (INT 14).

A fault, including a page fault interrupt, is defined within the Intel 80386 and 80486 processors as an exception which is detected and serviced before the execution of the faulting instruction. The presence of a P bit equal to 0 in a page table entry will cause a page fault within the preferred embodiment. Thus, the fact that the disk transfer has not been completed, as indicated by the P bit equal to 0 in the page table entry for the specified address, will be detected by the MMU 62 prior to the processor 20 completing execution of the instruction. This permits the processor 20 to restart the instruction after the page fault has been serviced, as will be discussed below. When interrupt occurs, the current program address and flags are saved on a stack to permit later resumption of processing. An interrupt vector is then issued to indicate the particular type of interrupt. Based on the type of interrupt, the processor 20 will execute the particular type of interrupt service routine (ISR). When the ISR completes, the old program state is restored and the application resumes processing. The ISR may be written to address specific exceptions to the instructions in various manners. The preferred embodiment contemplates the use of a special interrupt service routine to manage the page fault memory INT14.

Control transfers to step 450, wherein the page fault service routine INT14 ISR is called. Upon return from the INT14 ISR, control transfers to step 451. In step 451, the processor 20 clears the Release flag set by the device driver in FIG. 12, step 418. Control thereafter transfers to step 452.

If in step 446, it is determined that the specified memory address is not within a protected page table entry range, no page fault occurs and control transfers to step 452. In step 452, the processor 20 performs the actual memory access. Thereafter, control transfers to step 454 which ends the memory access operation.

Figure 15:
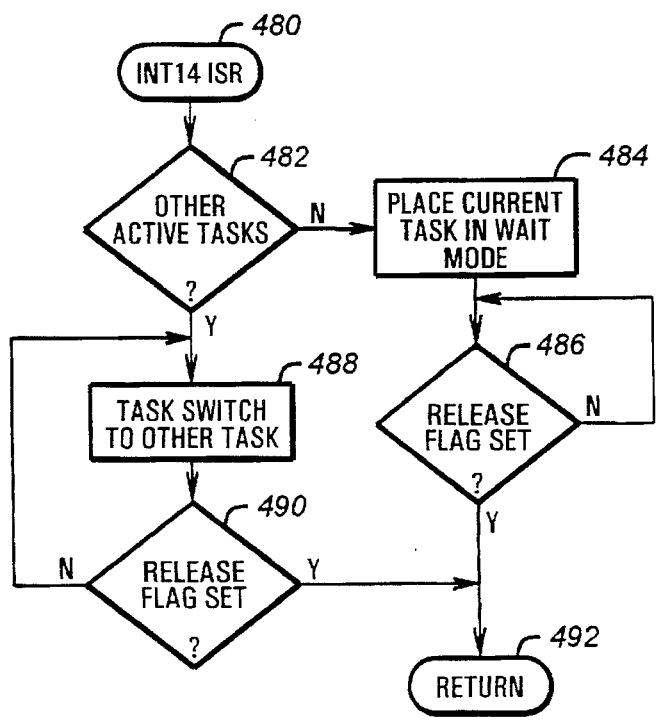
FIG. 15 is a flow diagram of the Interrupt Service Routine within the preferred method embodiment of the present invention.

FIG. 15 is a flow diagram of the INT14 ISR, the interrupt service routine for the page fault interrupt which has been invoked by an attempt to access an address which is included in a memory page having a Present bit set to 0. It is noted that the illustrated INT14 ISR is developed only for disk READ page faults. It is understood that the illustrated steps would be a small portion of the full INT14 ISR, which would handle other types of page faults and other INT14 conditions. In the full case, the INT14 ISR would have determined that the disk READ function is the basis of the page fault and would then execute the illustrated steps.

Operation of the INT14 ISR begins at step 480. Control transfers to step 482, wherein the processor 20 running INT14 ISR determines whether there are other tasks running in a virtual 8086 mode or protected mode on the computer C. If there are other tasks running in virtual 8086 mode or protected mode on the computer, control transfers to step 488, wherein the INT14 ISR instructs processor 20 to switch to another task. The techniques used to perform task switching on an 80386 or 80486 are known in the art and will not be discussed in detail herein.

Control thereafter transfers to step 490, wherein the processor 20, after having operated on other virtual tasks for the period specified by the task switching software, returns to the interrupted task and determines whether the device driver has set a Release flag as discussed in FIG. 12, step 418. If the Release flag has not been set, indicating that the disk to memory transfer has still not completed, control transfers to step 488, wherein the INT14 ISR will instruct the processor 20 to again switch to other active tasks. If in step 490, the processor 20 running INT14 ISR determines that the Release flag has been set by the device driver in response to the confirmation interrupt issued by the disk array controller 112, control transfers to step 492, which completes processing of the INT14 ISR and returns to the interrupted task, FIG. 14, step 451. Upon return from the INT14 ISR, control transfers to step 451 (FIG. 14), wherein the processor 20 clears the Release flag. Control thereafter transfers to step 452 (FIG. 14), wherein current task performs the memory READ access now that the data has been placed in memory. Control thereafter transfers to step 454, which ends execution of the memory READ access.

If it is determined in step 482 (FIG. 14) that there are no other active tasks, control transfers to step 484, wherein the INT14 ISR places the current task in a WAIT mode. Control transfers to step 486, wherein the INT14 ISR checks to see if the Release flag has been set. If the Release flag is set, control transfers to step 492, which returns to the interrupted task, step 451 (FIG. 14). If the Release flag is not set, control transfers to step 486, which continues to loop and the current task remains in a WAIT mode until the Release flag is present.

Thus, the preferred software embodiment of the present invention utilizes the 80386/80486 page memory management unit to protect 4 kbyte page memory frames until data transfer from disk to memory is actually complete. The processor 20 will clear the Present bit to zero upon issuing the disk READ request. Any attempt to access the page table entry will result in a page fault interrupt due to the Present bit being equal to 0. When the disk transfer actually completes, the disk controller 112 will create a hardware interrupt which will cause the device driver to set the Present bit, where no INT14 interrupt has occurred, or set the Release flag and set the Present bit to 1, where an INT14 interrupt has occurred.

If the current task attempts to access a memory address which falls within a page frame having the Present bit cleared to 0, the processor 20 will generate a page fault INT14, FIG. 14, step 448. The processor 20 will initiate the page fault interrupt service routine, INT14 ISR. The INT14 ISR will determine if other active tasks are running on processor 20 and will task switch to the other active tasks. The INT14 ISR will then check for the presence of the Release flag, indicating that the disk transfer has completed and that the data is available. If the Release flag is present, INT14 ISR returns to the interrupted task, wherein the device driver instructs the processor 20 to set the P bit in the page table entry to 1. The processor then clears the Release flag and performs the memory access. If the Release flag is not present, the INT14 ISR will instruct the processor 20 to continue to task switch or place the processor 20, where no other active tasks are running on processor 20, in a WAIT state until the confirmation signal is received. Thus, the preferred software embodiment is capable of performing a posted READ utilizing the paging mechanism.

It will be appreciated that not all disk to memory transfers will be exactly 4 kbytes long or aligned such that the entire transfer fits within one page frame. It is entirely possible that a disk to memory transfer may reference two or more memory pages. For instance, the transfer may fill an entire page and a portion of a second page. Another instance may occur when the disk to memory transfer is aligned on an address toward the end of a memory page, such that a portion of the minimum 512 byte transfer is referenced on one memory page and the remainder of the transfer appears on a second page. The present invention contemplates the setting of the Present bit and Release flag, when required, for each individual page. The present invention contemplates releasing the first page for memory access when the data transfer to the addresses referenced in the page has been completed. The Present bit for the second page remains cleared until the data transfer to the addresses referenced in that page is complete. Thus, the present invention contemplates releasing individual memory pages in a multiple page transfer as the data transfer to each individual page is completed.

It is also contemplated that a memory management unit may be designed to address page frame sizes smaller than 4 kbytes and utilized within the present invention. Further, it is also contemplated that the memory management unit may be used to release portions of the protected address range as the data is actually received.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. In a computer system running an applications task which halts operation after requesting data from disk until a disk read complete indication is provided, a method for performing posted disk read operations, the steps comprising:

generating a disk read request after receiving the applications task disk data request to transfer data from a disk to a range of main memory locations, said range of main memory locations having a starting memory address and a length;

providing the disk read complete indication after said disk read request is generated to cause the computer system to resume execution of the applications task prior to transfer of data from said disk to said range of main memory locations;

transferring data from said disk to said range of main memory locations after receipt of said disk read request;

delaying memory read access to said range of main memory locations after said disk read request is generated and until completion of said disk read request data transfer; and permitting memory read access to said range of main memory locations upon completion of said disk read request data transfer.

2. The method of claim 1, wherein said step of generating a disk read request includes the computer system issuing said disk read request to a disk controller;

wherein said step of providing the disk read complete indication includes the disk controller providing the disk read complete indication prior to completing said disk read request data transfer; and wherein said step of permitting memory read access includes said disk controller indicating actual completion of said disk read request data transfer.

3. The method of claim 1, further including the step of:

permitting memory read access to said range of main memory locations to which data has been transferred as data is transferred to said range of main memory locations prior to completion of said disk read request.

4. The method of claim 1, wherein the computer system includes a cache memory and said step of generating a disk read request includes flushing said cache memory prior to requesting said transfer of data.

5. The method of claim 1, wherein memory access operations are performed using a plurality of control signals and the step of delaying memory read access to said range of main memory locations includes the steps of:

determining if a memory read access address is within said range of main memory locations;

delaying assertion of said memory read access address and said plurality of control signals until completion of said disk read request data transfer, when said memory of said disk read request data transfer, when said memory access address is within said range of main memory locations; and determining when said disk read request data transfer has completed.

6. The method of claim 5, wherein the step of generating a disk read request includes storing addresses in registers, said addresses for determining if a memory read access address is within said range of main memory locations.

7. In a computer system utilizing paged memory management, the computer system running in a multitasking environment and executing at least one application task, said application task halting operation after requesting data from a disk until a disk read complete indication is provided, a method for performing posted disk read operations, the steps comprising:

generating a disk read request after receiving the applications task disk data request to transfer data from a disk to a range of main memory locations;

setting protection for at least one memory page, said memory page having a beginning memory address and a uniform memory size, said memory page including said range of main memory locations prior to transfer of data from said disk to said range of main memory locations;

providing the disk read complete indication after said disk read request is generated to cause the computer system to resume execution of the applications tasks prior to transfer of data from said disk to said range of main memory locations;

transferring said data from said disk to said range of main memory locations after receipt of said disk read request;

delaying memory read access to said range of main memory locations within said protected memory pages after said disk read request is generated and until completion of said disk read request data transfer; and releasing said protection for said memory pages upon completion of said disk read request data transfer, thereby permitting memory read access to said range of main memory locations.

8. The method of claim 7, wherein the step of delaying memory access includes switching to another task when there exists a plurality of application tasks running on the computer system.

9. The method of claim 7, wherein the step of delaying access includes placing the computer system into a wait state, when there are no other tasks running on the computer system.

10. The method of claim 7, wherein the step of setting protection for at least one memory page includes the steps of:

creating an entry in a table for each said protected memory page; and clearing a bit in each said entry, said bit indicating that said range of main memory locations within said protected memory pages may not be accessed.

11. The method of claim 7, wherein the computer system includes a cache memory and said step of generating a disk read request includes flushing said cache memory prior to requesting said transfer of data.

12. The method of claim 7, including setting protection for a plurality of memory pages, each of said plurality of memory pages including a portion of said range of main memory locations.

13. The method of claim 12, further including the step of permitting memory read access to said memory pages to which data has been transferred as said data is transferred to each said memory page prior to the completion of said disk read request transfer.

14. In a computer system running at least one applications task which halts operation after requesting data from a disk until a disk read complete indication is provided, an apparatus for performing posted disk read operations, the apparatus comprising:

means for requesting a transfer of data from a disk to main memory after receiving the applications task disk data request, said disk read request including a main memory starting address and a length;

means for providing the disk read complete indication after said disk read request is generated to cause the computer system to resume execution of the applications task prior to the completion of said disk read request;

means for transferring said data from said disk to said range of main memory locations after receipt of said disk read request;

means for delaying memory read access to said range of main memory locations until completion of said disk read request data transfer, said memory read access including a memory access address; and means for permitting access to said range of main memory locations upon completion of said disk read request, thereby permitting completion of said memory read access.

15. The apparatus of claim 14, wherein said means for delaying memory read access to said range of main memory locations includes means to switch to another applications task when a plurality of applications tasks are running on the computer system.

16. The apparatus of claim 14, wherein the computer system includes a cache memory and said means for requesting a transfer of data includes means for flushing said cache memory prior to requesting said transfer of data.

17. The apparatus of claim 14, wherein said means for delaying access to said range of main computer memory locations includes:

means for determining whether said memory access address is within said range of main memory locations;

means for delaying the assertion of said memory access address and control signals until said disk read request data transfer is completed when said memory access address is within said range of main memory locations; and means for determining when said disk read request data transfer is completed.

18. The apparatus of claim 17, including means for storing addresses in registers, said addresses for determining whether a memory access address is within said range of main memory locations.

* * * * *